(12) United States Patent
Tajima

(10) Patent No.: US 9,085,652 B2
(45) Date of Patent: Jul. 21, 2015

(54) METHOD FOR PRODUCING CONJUGATED DIENE-BASED POLYMER

(71) Applicant: Sumitomo Chemical Company, Limited, Tokyo (JP)

(72) Inventor: Koichiro Tajima, Chiba (JP)

(73) Assignee: Sumitomo Chemical Company, Limited, Tokyo (JP)

( * ) Notice: Subject to any disclaimer, the term of this patent is extended or adjusted under 35 U.S.C. 154(b) by 0 days.

(21) Appl. No.: 14/225,483

(22) Filed: Mar. 26, 2014

(65) Prior Publication Data

US 2014/0296459 A1    Oct. 2, 2014

(30) Foreign Application Priority Data

Mar. 28, 2013 (JP) ................. 2013-068498

(51) Int. Cl.
| | |
|---|---|
| *C08F 236/10* | (2006.01) |
| *C08F 236/14* | (2006.01) |
| *C08F 4/48* | (2006.01) |
| *C08G 77/54* | (2006.01) |

(52) U.S. Cl.
CPC ............. *C08F 236/10* (2013.01); *C08F 236/14* (2013.01); *C08G 77/54* (2013.01)

(58) Field of Classification Search
CPC ......... C08F 236/10; C08F 236/14; C08F 4/48
See application file for complete search history.

(56) References Cited

U.S. PATENT DOCUMENTS

| | | | |
|---|---|---|---|
| 4,971,936 A | 11/1990 | Wilson et al. | |
| 5,508,333 A * | 4/1996 | Shimizu | 524/424 |
| 5,700,874 A * | 12/1997 | Takeichi et al. | 525/288 |
| 6,566,478 B1 | 5/2003 | Henning et al. | |
| 2003/0181599 A1 | 9/2003 | Inagaki et al. | |
| 2010/0056710 A1* | 3/2010 | Oshima | 524/571 |

FOREIGN PATENT DOCUMENTS

| | | |
|---|---|---|
| EP | 0215256 A1 | 3/1987 |
| JP | 71011512 B * | 3/1971 |
| JP | S54-57586 A | 5/1979 |
| JP | S59-18709 A | 1/1984 |
| WO | 2010118962 A1 | 10/2010 |

OTHER PUBLICATIONS

Sigma-Aldrich (3,4-Dimethoxytoluene. Sigma-Aldrich. 2014, 2 pages).*
ChemSpider (Isohomoveratrol, ChemSpider, 2014, 2 pages).*
Derwent Abstract of JP 71-011512 (Acc. No. 1971-21220s, 1971).*
English language translation of JP 46-11512 (Mar. 24, 1971, 33 pages).*
Search Report and Written Opinion issued Jan. 12, 2015 in SG Application No. 10201401001R.

* cited by examiner

*Primary Examiner* — Brieann R Fink
(74) *Attorney, Agent, or Firm* — Panitch Schwarze Belisario & Nadel LLP

(57) ABSTRACT

Disclosed is a method for producing a conjugated diene-based polymer capable of affording a polymer composition useful as a material for tires excellent in fuel economy. Specifically, there is disclosed a method comprising polymerizing monomer components comprising a conjugated diene compound and an aromatic vinyl compound using an alkali metal-based polymerization initiator in the presence of a hydrocarbon solvent and an ether compound represented by the following formula (1), wherein R represents an alkyl group having 1 to 8 carbon atoms.

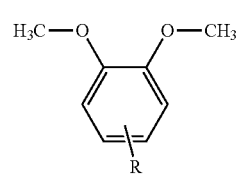

(1)

2 Claims, No Drawings

METHOD FOR PRODUCING CONJUGATED DIENE-BASED POLYMER

BACKGROUND OF THE INVENTION

1. Field of the Invention

The present invention relates to a method for producing a conjugated diene-based polymer from which a polymer composition can be obtained which is useful as a material of a tire excellent in fuel economy.

2. Description of the Related Art

Rubber compositions to be used for automotive tires capable of improving fuel economy have heretofore been known, and rubber compositions containing a conjugated diene-based polymer such as polybutadiene or a styrene-butadiene copolymer, and a reinforcing agent have been used.

For example, JP-A-59-18709 discloses a method for producing a conjugated diene-based polymer using ortho dialkoxybenzene.

However, tires produced from polymer compositions containing the above conventional conjugated diene-based polymer is not necessarily satisfactory in terms of fuel economy.

SUMMARY OF THE INVENTION

Under such situations, a problem to be solved by the present invention is to provide a method for producing a conjugated diene-based polymer capable of affording a polymer composition useful as a material for tires excellent in fuel economy.

That is, the present invention relates to a method for producing a conjugated diene-based polymer, the method comprising polymerizing monomer components comprising a conjugated diene compound and an aromatic vinyl compound using an alkali metal-based polymerization initiator in the presence of a hydrocarbon solvent and an ether compound represented by the following formula (1):

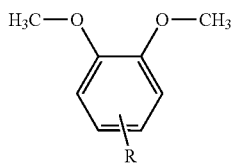

(1)

wherein R represents an alkyl group having 1 to 8 carbon atoms.

Moreover, the present invention relates to a method for producing a modified conjugated diene-based polymer, the method comprising polymerizing monomer components comprising a conjugated diene compound and an aromatic vinyl compound using an alkali metal-based polymerization initiator in the presence of a hydrocarbon solvent and an ether compound represented by the above formula (1) to obtain a conjugated diene-based polymer, and then causing a compound containing a nitrogen atom and/or a silicon atom to react with an active end of the conjugated diene-based polymer.

According to the present invention, it is possible to obtain a polymer composition useful as a material for a tire excellent in fuel economy.

DETAILED DESCRIPTION OF THE PREFERRED EMBODIMENTS

In the present specification, a hydrocarbyl group represents a monovalent group formed by removing one hydrogen atom from a hydrocarbon molecule. A hydrocarbylene group represents a divalent group obtained by removing two hydrogen atoms from a hydrocarbon. A hydrocarbyloxy group represents a monovalent group having a structure in which a hydrogen atom of a hydroxy group has been substituted with a hydrocarbyl group. An amino group having a substituent (hereinafter sometimes referred to as a substituted amino group) represents a group having a structure in which at least one hydrogen atom of an amino group has been substituted with a monovalent atom or a monovalent group other than a hydrogen atom, or a group having a structure in which two hydrogen atoms of an amino group have been substituted with a divalent group. A hydrocarbyl group having a substituent (hereinafter sometimes referred to as a substituted hydrocarbyl group) represents a monovalent group having a structure in which at least one hydrogen atom of a hydrocarbyl group has been substituted with a substituent. A hydrocarbylene group having a heteroatom (hereinafter sometimes referred to as a heteroatom-containing hydrocarbylene group) represents a divalent group having a structure in which a carbon atom other than a carbon atom from which a hydrogen atom has been removed, and/or a hydrogen atom of a hydrocarbylene group has been substituted with a group having a heteroatom (namely, an atom other than a carbon atom and a hydrogen atom).

(1) Method for Producing Conjugated Diene-Based Polymer

In the method for producing a conjugated diene-based polymer of the present invention, monomer components comprising a conjugated diene compound and an aromatic vinyl compound are polymerized using an alkali metal-based polymerization initiator in the presence of a hydrocarbon solvent and an ether compound represented by the following formula (1):

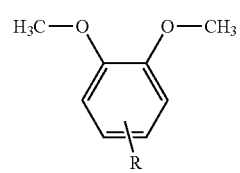

(1)

wherein R represents an alkyl group having 1 to 8 carbon atoms.

Examples of the conjugated diene compound include 1,3-butadiene, isoprene, 1,3-pentadiene, 2,3-dimethyl-1,3-butadiene, and 1,3-hexadiene, and 1,3-butadiene or isoprene is preferred.

Examples of the aromatic vinyl compound include styrene, α-methylstyrene, vinyltoluene, vinylnaphthalene, divinylbenzene, trivinylbenzene, and divinylnaphthalene, and styrene is preferred.

The amount to be used of the aromatic vinyl compound contained in the monomer components is preferably 9% by weight or more, more preferably 14% by weight or more, where the total amount to be used of the monomer components is taken as 100% by weight. In order to improve fuel economy, it is preferably 50% by weight or less, more preferably 45% by weight or less.

Examples of the alkali metal-based polymerization initiator include an alkali metal, an organoalkali metal compound, a complex of an alkali metal and a polar compound, and an oligomer having an alkali metal. Examples of the alkali metal include lithium, sodium, potassium, rubidium, and cesium. Examples of the organoalkali metal compound include ethyllithium, n-propyllithium, isopropyllithium, n-butyllithium, sec-butyllithium, tert-octyllithium, n-decyllithium, phenyllithium, 2-naphthyllithium, 2-buthylphenyl 4-phenylbutyllithium, cyclohexyllithium, cyclopentyllithium, dimethylaminopropyllithium, diethylaminopropyllithium, tert-buthyldimethylsilyloxypropyllithium, N-morpholinopropyllithium, lithium hexamethyleneimide, lithium pyrrolidide, lithium piperidide, lithium heptamethyleneimide, lithium dodecamethyleneimide, 1,4-dilithio-2-butene, sodium naphthalenide, sodium biphenylide, and potassium naphthalenide. In addition, examples of the complex of an alkali metal and a polar compound include a potassium-tetrahydrofuran complex and a potassium-diethoxyethane complex, and examples of the oligomer having an alkali metal include a sodium salt of an α-methylstyrene tetramer. Preferred is an organolithium compound or an organosodium compound, more preferred is an organolithium compound having 2 to 20 carbon atoms or an organosodium compound having 2 to 20 carbon atoms.

Examples of the hydrocarbon solvent include aliphatic hydrocarbons such as propane, butane, isobutane, pentane, isopentane, and hexane; aromatic hydrocarbons such as benzene, toluene, xylene, and ethylbenzene; and alicyclic hydrocarbons such as cyclopentane and cyclohexane. These may be used in a combination of two or more thereof.

In the present invention, the ether compound represented by formula (1) acts as a randomizer.

In formula (1), R is an alkyl group having 1 to 8 carbon atoms, and examples thereof include a methyl group, an ethyl group, a n-propyl group, an isopropyl group, a n-butyl group, an isobutyl group, a sec-butyl group, a tert-butyl group, a n-pentyl group, a n-hexyl group, and a n-octyl group, and preferred is a methyl group or an ethyl group. The ether compound represented by formula (1) is preferably 1,2-dimethoxy-4-methylbenzene or 1,2-dimethoxy-4-ethylbenzene.

The amount to be used of the ether compound represented by formula (1) is preferably 0.1 mmol to 10 mmol, more preferably 1 mmol to 8 mmol, per liter of the hydrocarbon solvent.

The polymerization of the monomer components may be performed in the presence of an agent capable of adjusting the amount of vinyl bonds of monomer units derived from the conjugated diene compound, and an agent capable of adjusting the distribution of monomer units derived from the conjugated diene compound, monomer units derived from the aromatic vinyl compound, and monomer units derived from a compound other than these compounds in a conjugated diene-based polymer chain (hereinafter collectively referred to as an "adjusting agent"). Examples of the adjusting agent include an ether compound other than the ether compound represented by formula (1), a tertiary amine, a phosphine compound, an alkali metal alkoxide, and an alkali metal phenoxide. Examples of the ether compound other than the ether compound represented by formula (1) include cyclic ethers such as tetrahydrofuran, tetrahydropyran, and 1,4-dioxane; aliphatic monoethers such as diethyl ether and dibutyl ether; aliphatic diethers such as ethylene glycol dimethyl ether, ethylene glycol diethyl ether, and ethylene glycol dibutyl ether; aliphatic triethers such as diethylene glycol diethyl ether and diethylene glycol dibutyl ether; and aromatic ethers such as diphenyl ether and anisole. Examples of the tertiary amine include triethylamine, tripropylamine, tributylamine, 1,1,2,2-tetramethylethylenediamine, N,N-diethylaniline, pyridine, and quinoline. Examples of the phosphine compound include trimethylphosphine, triethylphosphine, and triphenylphosphine. Examples of the alkali metal alkoxide include sodium tert-butoxide, potassium tert-butoxide, sodium tert-pentoxide, and potassium tert-pentoxide. Examples of the alkali metal phenoxide include sodium phenoxide and potassium phenoxide. These may be used in a combination of two or more thereof.

The amount of the alkali metal catalyst to be used for the polymerization of the monomer components is preferably 0.01 mmol to 15 mmol per 100 g of the monomer components to be used in the polymerization.

In the case of performing the polymerization of the monomer components in a solution containing a hydrocarbon as a solvent, the concentration of the monomer components in the solution is usually 1% by weight to 50% by weight, preferably 5% by weight to 30% by weight.

The polymerization temperature is usually 25° C. to 100° C., preferably 35° C. to 90° C. More preferably, the polymerization temperature is 50° C. to 80° C. The prepolymerization time is usually 10 minutes to 5 hours.

Preferred as the alkali metal catalyst is an organoalkali metal compound having a group containing a nitrogen atom. Examples of the group containing a nitrogen atom include a group represented by the following formula (2):

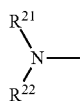

(2)

wherein $R^{21}$ and $R^{22}$ each independently represent a hydrocarbyl group optionally having a substituent or a trihydrocarbylsilyl group, or $R^{21}$ and $R^{22}$ are bonded to each other and the group in which $R^{21}$ is bonded to $R^{22}$ represents a hydrocarbylene group optionally having a nitrogen atom and/or an oxygen atom.

The organoalkali metal compound having a group represented by formula (2) is preferably a compound represented by the following formula (3):

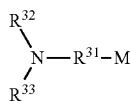

(3)

wherein $R^{31}$ represents a hydrocarbylene group having 6 to 100 carbon atoms, $R^{32}$ and $R^{33}$ each represent a hydrocarbyl group optionally having a substituent or a trihydrocarbylsilyl group, or $R^{32}$ is bonded to $R^{33}$ and the group in which $R^{32}$ is bonded to $R^{33}$ represents a hydrocarbylene group optionally having a nitrogen atom and/or an oxygen atom, a group having 0.5 to 20 carbon atoms represented by —Si$(R^{34})_2$—$(CH_2)_x$—Si$(R^{34})_2$— ($R^{34}$ represents a hydrocarbyl group, and x represents an integer of 1 to 10), or a group having 4 to 20 carbon atoms represented by —Si$(R^{35})_2$—$(CH_2)_y$— ($R^{35}$ represents a hydrocarbyl group, and y represents an integer of 2 to 11), and M represents an alkali metal atom.

In formula (3), $R^{31}$ is a hydrocarbylene group having 6 to 100 carbon atoms, preferably a hydrocarbylene group having 7 to 90 carbon atoms, more preferably a hydrocarbylene group having 8 to 80 carbon atoms. When the number of the carbon atoms of the hydrocarbylene group represented by $R^{31}$ is 5 or less, the solubility of the compound represented by formula (3) in a hydrocarbon solvent may lower. When the number of the carbon atoms of the hydrocarbylene group represented by $R^{31}$ is 100 or more, the molecular weight of the compound represented by formula (3) is so large that the economical efficiency and the operativity in the polymerization may deteriorate.

In formula (3), the hydrocarbylene group represented by $R^{31}$ is preferably a group represented by the following formula (3-1):

$$—(CH_2)_i—R^{36}— \quad (3\text{-}1)$$

wherein $R^{36}$ represents a hydrocarbylene group composed of a structural unit derived from a conjugated diene compound and/or a structural unit derived from an aromatic vinyl compound, i represents an integer of 1 to 10, and $(CH_2)_1$ is bonded to the nitrogen atom of formula (3).

In formula (3-1), $R^{36}$ represents a hydrocarbylene group composed of a structural unit derived from a conjugated diene compound and/or a structural unit derived from an aromatic vinyl compound, and is preferably a hydrocarbylene group composed of a structural unit derived from isoprene.

The number of the structural units of the conjugated diene compound in $R^{36}$ and/or the structural units derived from the aromatic vinyl compound is preferably 1 to 10, more preferably 1 to 5.

In formula (3-1), i is an integer of 1 to 10, preferably an integer of 2 to 4, and is more preferably 3.

Examples of the group represented by formula (3-1) include a group in which 1 to 10 structural units derived from isoprene are combined with a methylene group, a group in which 1 to 10 structural units derived from isoprene are combined with an ethylene group, and a group in which 1 to 10 structural units derived from isoprene are combined with a trimethylene group.

$R^{32}$ and $R^{33}$ in formula (3) each represent a hydrocarbyl group optionally having a substituent or a trihydrocarbylsilyl group, or $R^{32}$ is bonded to $R^{33}$ and the group in which $R^{32}$ is bonded to $R^{33}$ represents a hydrocarbylene group optionally having a nitrogen atom and/or an oxygen atom, a group having 5 to 20 carbon atoms represented by $—Si(R^{34})_2—(CH_2)_x—Si(R^{34})_2—$ ($R^{34}$ represents a hydrocarbyl group, and x represents an integer of 1 to 10), or a group having 4 to 20 carbon atoms represented by $—Si(R^{35})_2—(CH_2)_y—$ ($R^{35}$ represents a hydrocarbyl group, and y represents an integer of 2 to 11).

The hydrocarbyl group optionally having a substituent represented by $R^{32}$ or $R^{33}$ is a hydrocarbyl group or a substituted hydrocarbyl group. Examples of the substituent in the substituted hydrocarbyl group include a substituted amino group and a hydrocarbyloxy group. Examples of the hydrocarbyl group include alkyl groups such as a methyl group, an ethyl group, a n-propyl group, an isopropyl group, a n-butyl group, an isobutyl group, a sec-butyl group, a test-butyl group, a n-pentyl group, a n-hexyl group, a n-octyl group, and a n-dodecyl group; cycloalkyl groups such as a cyclopentyl group and a cyclohexyl group; and aryl groups such as a phenyl group and a benzyl group, an alkyl group is preferred, and an alkyl group having 1 to 4 carbon atoms is more preferred. Examples of the substituted hydrocarbyl group whose substituent is a substituted amino group include a N,N-dimethylaminomethyl group, a 2-N,N-dimethylaminoethyl group, and a 3-N,N-dimethylaminopropyl group. Examples of the substituted hydrocarbyl group whose substituent is a hydrocarbyloxy group include a methoxymethyl group, a methoxyethyl group, and an ethoxymethyl group. Of these, a hydrocarbyl group is preferred, an alkyl group having 1 to 4 carbon atoms is more preferred, and a methyl group or an ethyl group is even more preferred.

Examples of the trihydrocarbylsilyl group represented by $R^{32}$ or $R^{33}$ include a trimethylsilyl group and a tert-butyldimethylsilyl group, and a trimethylsilyl group is preferred.

The hydrocarbylene group optionally having a nitrogen atom and/or an oxygen atom in the group in which $R^{32}$ is bonded to $R^{33}$ is a hydrocarbylene group, or a heteroatom-containing hydrocarbylene group whose heteroatom is a nitrogen atom and/or an oxygen atom. Examples of the heteroatom-containing hydrocarbylene group whose heteroatom is a nitrogen atom and/or an oxygen atom include a heteroatom-containing hydrocarbylene group whose heteroatom is a nitrogen atom, and a heteroatom-containing hydrocarbylene group whose heteroatom is an oxygen atom. Examples of the hydrocarbylene group include alkylene groups such as a tetramethylene group, a pentamethylene group, a hexamethylene group, and a 2,2,4-trimethylhexane-1,6-diyl group; and alkenediyl groups such as a pentan-2-ene-1,5-diyl group, an alkylene group is preferred, and an alkylene group having 4 to 7 carbon atoms is more preferred. Examples of the heteroatom-containing hydrocarbylene group whose heteroatom is a nitrogen atom include a group represented by $—CH=N—CH=CH—$ and a group represented by $—CH=N—CH_2—CH_2—$. Examples of the heteroatom-containing hydrocarbylene group whose heteroatom is an oxygen atom include a group represented by $—CH_2—CH_2—O—CH_2—CH_2—$. Of these, a hydrocarbylene group is preferred, an alkylene group having 4 to 7 carbon atoms is more preferred, and a tetramethylene group, a pentamethylene group, and a hexamethylene group are even more preferred.

In the group in which $R^{32}$ is bonded to $R^{33}$, examples of the group having 5 to 20 carbon atoms represented by $—Si(R^{34})_2—(CH_2)_x—Si(R^{34})_2—$ ($R^{34}$ represents a hydrocarbyl group, and x represents an integer of 1 to 10) include a group represented by $—Si(CH_3)_2—CH_2—CH_2—Si(CH_3)_2—$. Examples of the group having 4 to 20 carbon atoms represented by $—Si(R^{35})_2—(CH_2)_y—$ ($R^{35}$ represents a hydrocarbyl group, and y represents an integer of 2 to 11) include a group represented by $—Si(CH_3)_2—CH_2—CH_2—CH_2—$.

Preferably, $R^{32}$ and $R^{33}$ are hydrocarbyl groups, or $R^{32}$ is bonded to $R^{33}$ and the group in which $R^{32}$ is bonded to $R^{33}$ is a hydrocarbylene group, more preferably, $R^{32}$ and $R^{33}$ are alkyl groups having 1 to 4 carbon atoms, or $R^{32}$ is bonded to $R^{33}$ and the group in which $R^{32}$ is bonded to $R^{33}$ is an alkylene group having 4 to 7 carbon atoms, even more preferably, $R^{32}$ and $R^{33}$ are alkyl groups having 1 to 4 carbon atoms, and particularly preferably, $R^{32}$ and $R^{33}$ are each a methyl group or an ethyl group.

In formula (3), M represents an alkali metal atom. Examples of the alkali metal atom include Li, Na, K and Cs, and Li is preferred.

Of the compounds represented by formula (3), examples of the compound wherein $R^{31}$ is a group represented by formula (3-1), $R^{32}$ and $R^{33}$ are each a hydrocarbyl group, and M is Li include a compound obtained by reacting 1 mol to 5 mol (per 1 mol of a (dialkylamino)alkyllithium compound) of isoprene with the (dialkylamino)alkyllithium compound.

Examples of the (dialkylamino)alkyllithium compound include 3-(dimethylamino)propyllithium, 3-(diethylamino)propyllithium, 3-(dibutylamino)propyllithium, 4-(dimethylamino)butyllithium, 4-(diethylamino)butyllithium, 4-(dipropylamino)butyllithium, and 3-(dibutylamino)butyllithium.

Of the compounds represented by formula (3), examples of the compound wherein $R^{31}$ is a group represented by formula (3-1), $R^{32}$ is bonded to $R^{33}$ and the group in which $R^{32}$ is bonded to $R^{33}$ is a hydrocarbylene group, and M is Li include a compound obtained by reacting 1 mol to 5 mol (per 1 mol of a (heteroatom-free cyclic amino)alkyllithium compound)) of isoprene with the (heteroatom-free cyclic amino)alkyllithium compound.

Examples of the (heteroatom-free cyclic amino)alkyllithium compound include 3-(1-pyrrolidinyl)propyllithium, 3-(1-piperidinyl)propyllithium, 3-(1-hexamethyleneimino) propyllithium, and 3-[1-(1,2,3,6-tetrahydropyridinyl)]propyllithium.

Of the compounds represented by formula (3), examples of the compound wherein $R^{31}$ is a group represented by formula (3-1), $R^{32}$ is bonded to $R^{33}$ and the group in which $R^{32}$ is bonded to $R^{33}$ is a heteroatom-containing hydrocarbylene group, and M is Li include a compound obtained by reacting 1 mol to 5 mol (per 1 mol of a (heteroatom-containing cyclic amino)alkyllithium compound)) of isoprene with the (heteroatom-containing cyclic amino)alkyllithium compound.

Examples of the (heteroatom-containing cyclic amino) alkyllithium compound include 3-(1-morpholino)propyllithium, 3-(1-imidazolyl)propyllithium, and 3-(4,5-dihydro-1-imidazolyl)propyllithium.

Of the compounds represented by formula (3), examples of the compound wherein $R^{31}$ is a group represented by formula (3-1), $R^{32}$ is bonded to $R^{33}$ and the group in which $R^{32}$ bonded to $R^{33}$ is is a group having 5 to 20 carbon atoms represented by —Si($R^{34}$)$_2$—(CH$_2$)$_x$—Si($R^{34}$)$_2$— ($R^{34}$ represents a hydrocarbyl group, and x represents an integer of 1 to 10), and M is Li include a compound obtained by reacting 1 mol to 5 mol of isoprene with 1 mol of 3-(2,2,5,5-tetramethyl-1-aza-2,5-disila-1-cyclopentyl)propyllithium.

Of the compounds represented by formula (3), examples of the compound wherein $R^{31}$ is a group represented by formula (3-1), $R^{32}$ is bonded to $R^{33}$ and the group in which $R^{32}$ is bonded to $R^{33}$ is a group having 4 to 20 carbon atoms represented by —Si($R^{35}$)$_2$—(CH$_2$)$_y$— ($R^{35}$ represents a hydrocarbyl group, and y represents an integer of 2 to 11), and M is Li include a compound obtained by reacting 1 mol to 5 mol of isoprene with 1 mol of 3-(2,2-dimethyl-1-aza-2,5-sila-1-cyclopentyl)propyllithium.

The compound represented by formula (3) is preferably a compound wherein $R^{31}$ is a group represented by formula (3-1), $R^{32}$ and $R^{33}$ are each a hydrocarbyl group, and M is Li, more preferably a compound wherein $R^{32}$ and $R^{33}$ are each an alkyl group having 1 to 4 carbon atoms, M is Li, $R^{31}$ is represented by formula (3-1), $R^{36}$ is a group composed of 1 to 5 structural units derived from isoprene, and i is 2 to 4, and even more preferably a compound obtained by reacting 1 mol to 5 mol of isoprene with 1 mol of 3-(dimethylamino) propyllithium or 3-(diethylamino) propyllithium.

The compound represented by formula (3) may be a mixture of a plurality of compounds differing in $R^{31}$.

Preferred as the organoalkali metal compound having a group represented by formula (2) is a compound obtained by reacting an organoalkali metal compound with a secondary amine compound having a group represented by formula (2).

Examples of compounds preferable as the organoalkali metal compound include organolithium compounds, organosodium compounds, organopotassium compounds, and organocesium compounds. Examples of the organolithium compounds include alkyllithium compounds such as methyllithium, ethyllithium, n-propyllithium, isopropyllithium, n-butyllithium, isobutyllithium, sec-butyllithium, tert-butyllithium, n-hexyllithium, and n-octyllithium; alkenyllithium compounds such as vinyllithium and propenyllithium; aryllithium compounds such as phenyllithium, benzyllithium, tolyllithium, and lithium naphthylide; alkylenedilithium compounds such as tetramethylene dilithium, pentamethylene dilithium, hexamethylene dilithium, and decamethylene dilithium; and lithium naphthalenide and lithium biphenylide. Examples of the organosodium compounds include sodium naphthalenide and sodium biphenylide. Examples of the organopotassium compounds include potassium naphthalenide. Preferred as the organoalkali metal compound is an organolithium compound, more preferred is an alkyllithium compound having 1 to 20 carbon atoms, and even more preferred are n-butyllithium, sec-butyllithium, and tert-butyllithium.

Examples of a compound preferable as the secondary amine compound having a group represented by formula (2) include a compound represented by the following formula (4):

(4)

wherein $R^{42}$ and $R^{43}$ each represent a hydrocarbyl group having 1 to 20 carbon atoms and optionally having a substituent, or $R^{42}$ is bonded to $R^{43}$ and the group in which $R^{42}$ is bonded to $R^{43}$ represents a hydrocarbylene group having 3 to 20 carbon atoms and optionally having a nitrogen atom and/or an oxygen atom, a group having 5 to 20 carbon atoms represented by —Si($R^{44}$)$_2$—(CH$_2$)$_x$—Si($R^{44}$)$_2$— ($R^{44}$ represents a hydrocarbyl group, and x represents an integer of 1 to 10), or a group having 4 to 20 carbon atoms represented by —Si($R^{45}$)$_2$—(CH$_2$)$_y$— ($R^{45}$ represents a hydrocarbyl group, and y represents an integer of 2 to 11).

The hydrocarbyl group having 1 to 20 carbon atoms and optionally having a substituent represented by $R^{42}$ or $R^{43}$ is a hydrocarbyl group having 1 to 20 carbon atoms or a substituted hydrocarbyl group having 1 to 20 carbon atoms. Examples of the substituted hydrocarbyl group having 1 to 20 carbon atoms include a substituted hydrocarbyl group having 1 to 20 carbon atoms and having a hydrocarbyloxy group as a substituent, a substituted hydrocarbyl group having 1 to 20 carbon atoms and having a substituted amino group as a substituent, a substituted hydrocarbyl group having 1 to 20 carbon atoms and having a trialkylsilyl group as a substituent, and a substituted hydrocarbyl group having 1 to 20 carbon atoms and having a trialkoxysilyl group as a substituent.

Examples of the hydrocarbyl group having 1 to 20 carbon atoms include alkyl groups such as a methyl group, an ethyl group, a n-propyl group, an isopropyl group, a n-butyl group, an isobutyl group, a sec-butyl group, a tert-butyl group, a n-hexyl group, a n-octyl group, and a n-dodecyl group; cycloalkyl groups such as a cyclopentyl group and a cyclohexyl group; and aryl groups such as a phenyl group, a tolyl group, a xylyl group, a benzyl group, and a naphthyl group. Examples of the substituted hydrocarbyl group having 1 to 20 carbon atoms and having a hydrocarbyloxy group as a substituent include alkoxyalkyl groups such as a methoxymethyl group, an ethoxymethyl group, a methoxyethyl group, and an ethoxyethyl group. Examples of the substituted hydrocarbyl group having 1 to 20 carbon atoms and having a substituted amino group as a substituent include dialkylaminoalkyl groups such as a dimethylaminomethyl group and a diethylaminomethyl group. Examples of the substituted hydrocarbyl group having 1 to 20 carbon atoms and having a trialkylsilyl group as a substituent include trialkylsilylalkyl group such as a trimethylsilylmethyl group, a 2-trimethylsilylethyl group, and a 3-trimethylsilylpropyl group. Examples of the substituted hydrocarbyl group having 1 to 20 carbon atoms and having a trialkoxysilyl group as a substituent include trialkoxysilylalkyl groups such as a trimethoxysilylmethyl group, a 2-trimethoxysilylethyl group, and a 3-trimethoxysilylpropyl group.

Preferred as the hydrocarbyl group having 1 to 20 carbon atoms and optionally having a substituent represented by $R^{42}$ or $R^{43}$ is a hydrocarbyl group having 1 to 20 carbon atoms, more preferred is an alkyl group having 1 to 10 carbon atoms, and even more preferred is an ethyl group, a n-propyl group, an isopropyl group, or a n-butyl group.

Of the compounds represented by formula (4), examples of the compound wherein $R^{42}$ and $R^{43}$ are each a hydrocarbyl group having 1 to 20 carbon atoms include dialkylamines such as dimethylamine, diethylamine, methylethylamine, di-n-propylamine, diisopropylamine, di-n-butylamine, diisobutylamine, di-sec-butylamine, di-tert-butylamine, di-n-hexylamine, and di-n-octylamine; dicycloalkylamines such as dicyclohexylamine; alkylarylamines such as N-methylaniline, N-ethylaniline, and N-methyl-N-benzylamine; and diarylamines such as diphenylamine.

Of the compounds represented by formula (4), examples of the compound wherein at least one of $R^{42}$ and $R^{43}$ is a substituted hydrocarbyl group having 1 to 20 carbon atoms include di(alkoxyalkyl)amines such as di(methoxymethyl)amine, di(ethoxymethyl)amine, di(2-methoxyethyl)amine, and di(2-ethoxyethyl)amine; bis(dialkylaminoalkyl)amines such as bis(dimethylaminomethyl)amine; trialkylsilylalkyl group-containing amine compounds such as trimethylsilylpropylmethylamine; and trialkoxysilylalkyl group-containing amine compounds such as trimethoxysilylpropylmethylamine.

In the group in which $R^{42}$ is bonded to $R^{43}$, the hydrocarbylene group having 3 to 20 carbon atoms and optionally having a nitrogen atom and/or an oxygen atom is a hydrocarbylene group having 3 to 20 carbon atoms, or a heteroatom-containing hydrocarbylene group having 3 to 20 carbon atoms and having a nitrogen atom and/or an oxygen atom as the heteroatom. Examples of the heteroatom-containing hydrocarbylene group having 3 to 20 carbon atoms and having a nitrogen atom and/or an oxygen atom as the heteroatom include a heteroatom-containing hydrocarbylene group having 3 to 20 carbon atoms whose heteroatom is a nitrogen atom, and a heteroatom-containing hydrocarbylene group having 3 to 20 carbon atoms whose heteroatom is an oxygen atom.

Examples of the hydrocarbylene group having 3 to 20 carbon atoms include alkylene groups such as a tetramethylene group, a pentamethylene group, a hexamethylene group, an octamethylene group, a decamethylene group, a dodecamethylene group, a hexane-1,5-diyl group, a 2-methylpentane-1,5-diyl group, a 3-methylpentane-1,5-diyl group, a 2,4-methylpentane-1,5-diyl group, and a 2,2,4-trimethylhexane-1,6-diyl group. Examples of the heteroatom-containing hydrocarbylene group having 3 to 20 carbon atoms whose heteroatom is a nitrogen atom include a group represented by —CH=N—CH=CH— and a group represented by —CH=N—CH$_2$—CFH=. Examples of the heteroatom-containing hydrocarbylene group having 3 to 20 carbon atoms whose heteroatom is an oxygen atom include a group represented by —CH$_2$—CH$_2$—O—CH$_2$—CH$_2$—.

In the group in which $R^{42}$ is bonded to $R^{43}$, examples of the group having 5 to 20 carbon atoms represented by —Si($R^{44}$)$_2$—(CH$_2$)$_x$—Si($R^{44}$)$_2$— ($R^{44}$ represents a hydrocarbyl group, and x represents an integer of 1 to 10) include a group represented by —Si(CH$_3$)$_2$—CH$_2$—CH$_2$—Si(CH$_3$)$_2$—. Examples of the group having 4 to 20 carbon atoms represented by —Si($R^{45}$)$_2$—(CH$_2$)$_y$— ($R^{45}$ represents a hydrocarbyl group, and y represents an integer of 2 to 11) include a group represented by —Si(CH$_3$)$_2$—CH$_2$—CH$_2$—CH$_2$—.

Of the compounds represented by formula (4), examples of the compound wherein $R^{42}$ is bonded to $R^{43}$ and the group wherein $R^{42}$ is bonded to $R^{43}$ is a hydrocarbylene group having 3 to 20 carbon atoms include trimethyleneimine, pyrrolidine, piperidine, 2-methylpiperidine, hexamethyleneimine, octamethyleneimine, decamethyleneimine, dodecamethyleneimine, 2-methylpiperidine, 3-methylpiperidine, 4-methylpiperidine, 3,5-dimethylpiperidine, 1,2,3,6-tetrahydro pyridine, 3,5,5-trimethylhexahydroazepine, and 1,3,3-trimethyl-6-azabicyclo[3,2,2]octane.

Of the compounds represented by formula (4), examples of the compound wherein $R^{42}$ is bonded to $R^{43}$ and the group in which $R^{42}$ is bonded to $R^{43}$ is a heteroatom-containing hydrocarbylene group having 3 to 20 carbon atoms and having a nitrogen atom and/or an oxygen atom as the heteroatom include imidazole, 4,5-dihydroimidazole, and morpholine.

Of the compounds represented by formula (4), examples of the compound wherein $R^{42}$ is bonded to $R^{43}$ the group in which $R^{42}$ is bonded to $R^{43}$ is a group having 5 to 20 carbon atoms represented by —Si($R^{44}$)$_2$—(CH$_2$)$_x$—Si($R^{44}$)$_2$— ($R^{44}$ represents a hydrocarbyl group, and x represents an integer of 1 to 10) include 2,2,5,5-tetramethyl-1-aza-2,5-disilacyclopentane, and examples of the compound wherein the group in which $R^{42}$ is bonded to $R^{43}$ is a group having 4 to 20 carbon atoms represented by —Si($R^{45}$)$_2$—(CH$_2$)$_y$— ($R^{45}$ represents a hydrocarbyl group, and y represents an integer of 2 to 11) include 2,2-dimethyl-1-aza-2-silacyclopentane.

Preferred as the secondary amine compound is a compound wherein $R^{42}$ is bonded to $R^{43}$ in formula (4) (a compound represented by the following formula (4-1))

(4-1)

wherein $R^{46}$ represents a hydrocarbylene group having 3 to 20 carbon atoms and optionally having a nitrogen atom and/or an oxygen atom, a group having 5 to 20 carbon atoms represented by —Si($R^{47}$)$_2$—(CH$_2$)$_x$—Si($R^{47}$)$_2$— ($R^{47}$ represents a hydrocarbyl group, and x represents an integer of 1 to 10), or a group having 4 to 20 carbon atoms represented by —Si($R^{48}$)$_2$—(CH$_2$)$_y$— ($R^{48}$ represents a hydrocarbyl group, and y represents an integer of 2 to 11).

$R^{46}$ is preferably a hydrocarbylene group having 3 to 20 carbon atoms, more preferably an alkylene group having 4 to 8 carbon atoms, and even more preferably a tetramethylene group, a pentamethylene group, or a hexamethylene group.

Particularly preferred as the compound represented by formula (4-1) are pyrrolidine, piperidine, and hexamethyleneimine.

In the method for producing a conjugated diene-based polymer of the present invention, the copolymerization is preferably carried out using monomer components further comprising a compound that contains a hydrocarbyl group having a polymerizable carbon-carbon double bond and also contains a nitrogen atom and/or a silicon atom.

A compound preferable as the compound that contains a hydrocarbyl group having a polymerizable carbon-carbon double bond and also contains a nitrogen atom and/or a silicon atom is a compound represented by the following formula (5) or a compound represented by the following formula (5'):

$$R^5\text{-}A^5 \qquad (5)$$

wherein $R^5$ represents a hydrocarbyl group having a polymerizable carbon-carbon double bond, and $A^5$ represents a substituted amino group or a nitrogen-containing heterocyclic group, $$R^9\text{-}A^9 \quad (5')$$

wherein $R^9$ represents a hydrocarbyl group having a polymerizable carbon-carbon double bond, and $A^5$ represents a substituted silyl group.

$R^5$ in formula (5) represents a hydrocarbyl group having a polymerizable carbon-carbon double bond, and $A^5$ represents a substituted amino group or a nitrogen-containing heterocyclic group.

$R^5$ is preferably a group represented by the following formula (5-1):

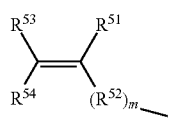
(5-1)

wherein m represents an integer of 0 or 1, $R^{51}$, $R^{53}$, and $R^{54}$ are each a hydrogen atom or a hydrocarbyl group, and $R^{52}$ represents a hydrocarbylene group.

In formula (5-1), m represents an integer of 0 or 1.

Examples of the hydrocarbyl group represented by $R^{51}$, $R^{53}$, or $R^{54}$ include an alkyl group, an alkenyl group, and an aryl group. Examples of the alkyl group include a methyl group, an ethyl group, a n-propyl group, an isopropyl group, a n-butyl group, a sec-butyl group, and a tert-butyl group, and preferred is a methyl group. Examples of the alkenyl group include a vinyl group, an allyl group, a 1-propenyl group, and an isopropenyl group, and preferred is a vinyl group. Examples of the aryl group include a phenyl group, a methylphenyl group, and an ethylphenyl group, and preferred is a phenyl group.

Preferred as $R^{51}$ is a hydrogen atom, a methyl group, a vinyl group, or a phenyl group, and more preferred is a hydrogen atom.

Preferred as $R^{53}$ and $R^{54}$ is a hydrogen atom.

Examples of the hydrocarbylene group represented by $R^{52}$ include an alkylene group, an arylene group, and a group in which an arylene group is bonded to an alkylene group.

Examples of the alkylene group include a methylene group, an ethylene group, and a trimethylene group. Preferred is a methylene group or an ethylene group. Examples of the arylene group include a phenylene group, a naphthylene group, and a biphenylene group. Preferred is a phenylene group. More preferred is a para-phenylene group or a meta-phenylene group.

Examples of the group in which an arylene group is bonded to an alkylene group include a group in which a phenylene group is bonded to an alkylene group, a group in which a naphthylene group is bonded to an alkylene group, and a group in which a biphenylene group is bonded to an alkylene group. Preferred is a group in which a phenylene group is bonded to an alkylene group.

As to the group in which an arylene group is bonded to an alkylene group, a carbon atom of the arylene group is preferably bonded to the carbon atom to which $R^{51}$ of formula (5-1) is bonded.

Examples of the group in which a phenylene group is bonded to an alkylene group (hereinafter sometimes referred to as a phenylene-alkylene group) include a group represented by the following formula (5-2):

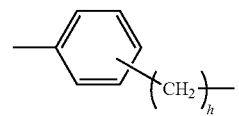
(5-2)

wherein h represents an integer of 1 to 10, and $(CH_2)_h$ is a substituent on the benzene ring.

Examples of the phenylene-alkylene group include, depending upon the position of the carbon atom on the benzene ring to which the alkylene group is bonded, a para-phenylene-alkylene group, a meta-phenylene-alkylene group, and an ortho-phenylene-alkylene group. In the case of a group represented by formula (5-2), the para-phenylene-alkylene group is a group represented by the following formula (5-2a), the meta-phenylene-alkylene group is a group represented by the following formula (5-2b), and the ortho-phenylene-alkylene group is a group represented by the following formula (5-2c):

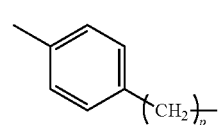
(5-2a)

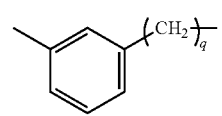
(5-2b)

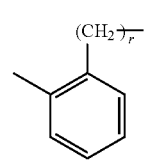
(5-2c)

wherein p, q, and r each represent an integer of 1 to 10.

h in formula (5-2), p in formula (5-2a) in formula (5-2b), and r in formula (5-2c) are preferably 1 to 5, more preferably 1 or 2, and even more preferably 2.

Preferred as the group in which an arylene group is bonded to an alkylene group is a group in which a phenylene group is bonded to an alkylene group, more preferred is a group represented by the above formula (5-2a) or a group represented by the above formula (5-2b), even more preferred is a para-phenylene-methylene group (a group represented by formula (5-2a) wherein p=1), a meta-phenylene-methylene group (a group represented by formula (5-2b) wherein q=1), a para-phenylene-ethylene group (a group represented by formula (5-2a) wherein p=2), or a meta-phenylene-ethylene group (a group represented by formula (5-2b) wherein q=2), and particularly preferred is a para-phenylene-ethylene group (a group represented by formula (5-2a) wherein p=2) or a meta-phenylene-ethylene group (a group represented by formula (5-2b) wherein q=2).

Examples of the group represented formula (5-1) include the groups shown below.

Examples of the group in which $R^{51}$, $R^{53}$, and $R^{54}$ are hydrogen atoms include a vinyl group, an allyl group, a 3-butenyl group, a 4-vinylphenyl group, a 3-vinylphenyl group, a (4-vinylphenyl)methyl group, a 2-(4-vinylphenyl) ethyl group, a (3-vinylphenyl)methyl group, and a 2-(3-vinylphenyl)ethyl group.

Examples of the group in which $R^{51}$ is a methyl group and $R^{53}$ and $R^{54}$ are hydrogen atoms include an isopropenyl group, a 2-methyl-2-propenyl group, a 4-isopropenylphenyl group, a 3-isopropenylphenyl group, a (4-isopropenylphenyl)methyl group, a 2-(4-isopropenylphenyl)ethyl group, a (3-isopropenylphenyl)methyl group, and a 2-(3-isopropenylphenyl)ethyl group.

Examples of the group in which $R^{51}$ is a vinyl group and $R^{53}$ and $R^{54}$ are hydrogen atoms include a 1-methylene-2-propenyl group and a 2-methylene-3-butenyl group.

Examples of the group in which $R^{51}$ is a phenyl group and $R^{53}$ and $R^{54}$ are hydrogen atoms include a 1-phenylethenyl group, 2-phenyl-2-propenyl group, a 4-(1-phenylethenyl)phenyl group, a 3-(1-phenylethenyl)phenyl group, and a 2-(1-phenylethenyl)phenyl group.

Examples of the group in which $R^{51}$ is a hydrogen atom, $R^{53}$ is a methyl group, and $R^{54}$ is a hydrogen atom include a 1-propenyl group, a 2-butenyl group, a 4-(1-propenyl)phenyl group, a 4-(1-propenyl)phenylmethyl group, a 2-[4-(1-propenyl)phenyl]ethyl group, a 3-(1-propenyl)phenyl group, a 3-(1-propenyl)phenylmethyl group, and a 2-[3-(1-propenyl)phenyl]ethyl group.

The group represented by formula (5-1) is preferably a group represented by the following formula (5-1a)

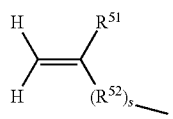

(5-1a)

wherein $R^{51}$ represents a hydrogen atom or a hydrocarbyl group, a represents an integer of 0 or 1, and $R^{52}$ represents a hydrocarbylene group.

Among preferable groups represented by formula (5-1a), examples of the group in which $R^{51}$ is a hydrogen atom include a vinyl group, a 4-vinylphenyl group, a 3-vinylphenyl group, a (4-vinylphenyl)methyl group, a 2-(4-vinylphenyl)ethyl group, a (3-vinylphenyl)methyl group, and 2-(3-vinylphenyl)ethyl group. Examples of the group in which $R^{51}$ is a methyl group include a 4-isopropenylphenyl group, a 3-isopropenylphenyl group, a (4-isopropenylphenyl)methyl group, a 2-(4-isopropenylphenyl)ethyl group, a (3-isopropenylphenyl)methyl group, and a 2-(3-isopropenylphenyl)ethyl group. Examples of the group in which $R^{51}$ is a vinyl group include a 1-methylene-2-propenyl group and a 2-methylene-3-butenyl group. Examples of the group in which $R^{51}$ is a phenyl group include a 4-(1-phenylethenyl)phenyl group.

As the group represented by formula (5-1a), a group in which $R^{51}$ is a hydrogen atom is more preferred, and a group in which s=1 and $R^{52}$ is a group represented by formula (5-2), a vinylphenyl group, or a vinyl group is even more preferred.

In formula (5), $A^5$ represents a substituted amino group or a nitrogen-containing heterocyclic group.

Preferred as the substituted amino group of $A^5$ is a group represented by the following formula (5-3):

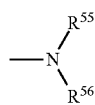

(5-3)

wherein $R^{55}$ and $R^{56}$ are each a hydrocarbyl group or a trihydrocarbylsilyl group, or $R^{55}$ is bonded to $R^{56}$ and the group in which $R^{55}$ is bonded to $R^{56}$ represents a hydrocarbylene group optionally having a nitrogen atom and/or an oxygen atom, or $R^{55}$ and $R^{56}$ represent together a group that is bonded to the nitrogen atom via a double bond.

Examples of the hydrocarbyl group represented by $R^{55}$ or $R^{56}$ include an alkyl group, an alkenyl group, an alkynyl group, an aryl group, and an aralkyl group. Examples of the alkyl group include a methyl group, an ethyl group, a n-propyl group, an isopropyl group, a n-butyl group, a sec-butyl group, and a tert-butyl group. Examples of the alkenyl group include a vinyl group, an allyl group, a 1-propenyl group, and an isopropenyl group. Examples of the alkynyl group include an ethynyl group and a 2-propynyl group. Examples of the aryl group include a phenyl group, a tolyl group, and a xylyl group. Examples of the aralkyl group include a benzyl group.

The number of the carbon atoms of the hydrocarbyl group represented by $R^{55}$ or $R^{56}$ is preferably 1 to 10, more preferably 1 to 4, and even more preferably 1 to 2.

The hydrocarbyl group represented by $R^{55}$ or $R^{56}$ is preferably an alkyl group or an alkenyl group, more preferably an alkyl group, and even more preferably a linear alkyl group.

Examples of the trihydrocarbylsilyl group represented by $R^{55}$ or $R^{56}$ include trialkylsilyl groups such as a trimethylsilyl group, a triethylsilyl group, a triisopropylsilyl group, and a tert-butyl-dimethylsilyl group.

The trihydrocarbylsilyl group represented by $R^{55}$ or $R^{56}$ is preferably a trialkylsilyl group having 3 to 9 carbon atoms, more preferably a trialkylsilyl group in which the alkyl group bonded to the silicon atom is an alkyl group having 1 to 4 carbon atoms, and even more preferably a trimethylsilyl group.

In the group in which $R^{55}$ is bonded to $R^{56}$, examples of the hydrocarbylene group optionally having a nitrogen atom and/or an oxygen atom include a hydrocarbylene group, heteroatom-containing hydrocarbylene group having a nitrogen atom as the heteroatom, and a heteroatom-containing hydrocarbylene group having an oxygen atom as the heteroatom. Examples of the hydrocarbylene group include alkylene groups such as an ethylene group, a trimethylene group, a tetramethylene group, a pentamethylene group, and a hexamethylene group, and a 1,3-butadiene-1,4-diyl group. Examples of the heteroatom-containing hydrocarbylene group having a nitrogen atom as the heteroatom include a group represented by —$CH_2CH_2$—NH—$CH_2$—, a group represented by —$CH_2CH_2$—N=CH—, a group represented by —CH=CH—N=CH—, and a group represented by —$CH_2CH_2$—NH—$CH_2CH_2$—. Examples of the heteroatom-containing hydrocarbylene group having an oxygen atom as the heteroatom include a group represented by —$CH_2$—$CH_2$—O—$CH_2$—$CH_2$—.

The number of the carbon atoms of the group in which $R^{55}$ is bonded to $R^{56}$ is preferably 2 to 20, more preferably 3 to 8, and even more preferably 4 to 6.

In the group in which $R^{55}$ is bonded to $R^{56}$, the hydrocarbylene group optionally having a nitrogen atom and/or an oxygen atom is preferably a hydrocarbylene group, more preferably an alkyl ene group, and even more preferably a polymethylene group.

Examples of the group that is represented by $R^{55}$ and $R^{56}$ together and is bonded to the nitrogen atom via a double bond include hydrocarbylidene groups such as an ethylidene group, a propylidene group, a butylidene group, a 1-methylethylidene group, a 1-methylpropylidene group, and a 1,3-dimethylbutylidene group.

The number of the carbon atoms of the group that is represented by $R^{55}$ and $R^{56}$ together and is bonded to the nitrogen atom via a double bond is preferably 2 to 20, more preferably 2 to 6.

Preferably, $R^{55}$ and $R^{56}$ are a hydrocarbyl group or a trihydrocarbylsilyl group, or alternatively $R^{55}$ is bonded to $R^{56}$ and the group in which $R^{55}$ is bonded to $R^{56}$ is a hydrocarbylene group.

Examples of the group represented by formula (5-3) include an acyclic amino group and a cyclic amino group.

Among acyclic amino groups, examples of the group of formula (5-3) in which $R^{55}$ and $R^{56}$ are each a hydrocarbyl group include dialkylamino groups such as a dimethylamino group, a diethylamino group, a di(n-propyl)amino group, a di(isopropyl)amino group, a di(n-butyl)amino group, a di(sec-butyl)amino group, a di(tert-butyl)amino group, and an ethylmethylamino group. Among acyclic amino groups, examples of the group of formula (5-3) in which $R^{55}$ and $R^{56}$ are each a trihydrocarbylsilyl group include bis(trialkylsilyl) amino groups such as a bis(trimethylsilyl)amino group and a bis(tert-butyl-dimethylsilyl)amino group.

Among acyclic amino groups, examples of the group of formula (5-3) in which $R^{55}$ and $R^{56}$ represent together a group that is bonded to the nitrogen atom via a double bond include an ethylideneamino group, a 1-methylpropylideneamino group, a 1,3-dimethylbutylideneamino group, a 1-methylethylideneamino group, and 4-N,N-dimethylaminobenzylideneamino group.

Among such cyclic amino groups, examples of a group of formula (5-3) in which $R^{55}$ is bonded to $R^{56}$ and the group in which $R^{55}$ is bonded to $R^{56}$ is a hydrocarbylene group include a 1-aziridinyl group, a 1-azetidinyl group, a 1-pyrrolidinyl group, a 1-piperidinyl group, a 1-hexamethyleneimino group, and a 1-pyrrolyl group.

Among cyclic amino groups, examples of a group of formula (5-3) in which $R^{55}$ is bonded to $R^{56}$ and the group in which $R^{55}$ is bonded to $R^{56}$ is a hydrocarbylene group having a nitrogen atom include a 1-imidazolyl group, a 4,5-dihydro-1-imidazolyl group, a 1-imidazolidinyl group, and a 1-piperazinyl group.

Among cyclic amino groups, examples of a group of formula (5-3) in which $R^{55}$ is bonded to $R^{56}$ and the group in which $R^{55}$ is bonded to $R^{56}$ is a hydrocarbylene group having an oxygen atom include a morpholino group.

The group represented by formula (5-3) is preferably a group in which $R^5$ and $R^{56}$ are each a hydrocarbyl group, a group in which $R^{55}$ and $R^{56}$ are each a trihydrocarbylsilyl group, or a group in which $R^{55}$ is bonded to $R^{56}$ and the group in which $R^{55}$ is bonded to $R^{56}$ is a hydrocarbylene group. More preferred is a group in which $R^{55}$ and $R^{56}$ are each a linear alkyl group, a group in which $R^{55}$ and $R^{56}$ are each a trialkylsilyl group, or a group in which the group in which $R^{55}$ is bonded to $R^{56}$ is a polymethylene group.

A more preferred group as the group represented by formula (5-3) in which $R^{55}$ and $R^{56}$ are each a linear alkyl group is a dimethylamino group, a diethylamino group, a di(n-propyl)amino group, or a di(n-butyl)amino group, a more preferred group in which $R^{55}$ and $R^{56}$ are each a trialkylsilyl group is a bis(trimethylsilyl) amino group or a bis(tert-butyl dimethylsilyl) amino group, and a more preferred group wherein the group in which $R^{55}$ is bonded to $R^{56}$ is a polymethylene group is a 1-pyrrolidinyl group, a 1-piperidinyl group, or a 1-hexamethyleneimino group.

Examples of the nitrogen-containing heterocyclic group represented by $A^5$ include a nitrogen-containing heteroalicyclic group and a nitrogen-containing aromatic heterocyclic group. In this specification, the nitrogen-containing heteroalicyclic group represents a group formed by removing one of the hydrogen atoms bonded to the carbon atoms of the heterocyclic ring of a compound having a nitrogen-containing alicyclic heterocyclic ring, and the nitrogen-containing alicyclic heterocyclic ring represents an alicyclic heterocyclic ring having a nitrogen atom as a heteroatom included in the atoms constituting the ring. In addition, the nitrogen-containing aromatic heterocyclic group represents a group formed by removing one of the hydrogen atoms bonded to the carbon atoms of the heterocyclic ring of a compound having a nitrogen-containing aromatic heterocyclic ring, and the nitrogen-containing aromatic heterocyclic ring represents an aromatic heterocyclic ring having a nitrogen atom as a heteroatom included in the atoms constituting the ring.

Examples of the nitrogen-containing heteroalicyclic group represented by $A^5$ include a group having only a nitrogen atom as a heteroatom included in the atoms constituting the ring, a group having a nitrogen atom and an oxygen atom as heteroatoms included in the atoms constituting the ring, and a group having a nitrogen atom and a sulfur atom as heteroatoms included in the atoms constituting the ring.

Examples of the nitrogen-containing heteroalicyclic group containing only a nitrogen atom as a heteroatom included in the atoms constituting the ring include a group having an aziridine ring, a group having an azetidine ring, a group having a pyrrolidine ring, a group having a piperidine ring, a group having a hexamethyleneimine ring, a group having an imidazolidine ring, a group having a piperazine ring, and a group having a pyrazolidine ring.

Examples of the group having an aziridine ring include a 1-alkyl-2-aziridinyl group. Examples of the group having an azetidine ring include a 1-alkyl-2-azetidinyl group and a 1-alkyl-3-azetidinyl group. Examples of the group having a pyrrolidine ring include a 1-alkyl-2-pyrrolidinyl group and a 1-alkyl-3-pyrrolidinyl group. Examples of the group having a piperidine ring include a 1-alkyl-2-piperidinyl group, a 1-alkyl-3-piperidinyl group, and a 1-alkyl-4-piperidinyl group. Examples of the group having a hexamethyleneimine ring include a 1-alkyl-2-hexamethyleneimino group, a 1-alkyl-3-hexamethyleneimino group, and a 1-alkyl-4-hexamethyleneimino group. Examples of the group having an imidazolidine ring include a 1,3-dialkyl-2-imidazolidyl group and a 1,3-dialkyl-4-imidazolidyl group. Examples of the group having a piperazine ring include a 1,4-dialkyl-2-piperazinyl group. Examples of the group having a pyrazolidine ring include a 1,2-dialkyl-3-pyrazolidyl group and a 1,2-dialkyl-4-pyrazolidyl group.

Examples of the nitrogen-containing heteroalicyclic group having a nitrogen atom and an oxygen atom as heteroatoms included in the atoms constituting the ring include a group having a morpholine ring and a group having an isooxazolidine ring.

Examples of the group having a morpholine ring include a 4-alkyl-2-morpholino group and a 4-alkyl-3-morpholino group. Examples of the group having an isooxazolidine ring include a 2-alkyl-3-isooxazolidinyl group, a 2-alkyl-4-isooxazolidinyl group, and a 2-alkyl-5-isooxazolidinyl group.

Examples of the nitrogen-containing heteroalicyclic group having a nitrogen atom and a sulfur atom as heteroatoms included in the atoms constituting the ring include a group having a thiomorpholine ring and a group having an isothiazolidine ring.

Examples of the group having a thiomorpholine ring include a 4-alkyl-2-thiomorpholino group and a 4-alkyl-3-thiomorpholino group. Examples of the group having an isothiazolidine ring include a 2-alkyl-3-isothiazolydinyl group, a 2-alkyl-4-isothiazolydinyl group, and a 2-alkyl-5-isothiazolydinyl group.

Preferred as the nitrogen-containing heteroalicyclic group of $A^5$ is a group having only a nitrogen atom as a heteroatom constituting a ring. The number of the carbon atoms of the nitrogen-containing heteroalicyclic group is preferably 4 to 10.

Examples of the nitrogen-containing aromatic heterocyclic group represented by $A^5$ include a group having only a nitrogen atom as a heteroatom included in the atoms constituting the ring, a group having a nitrogen atom and an oxygen atom as heteroatoms included in the atoms constituting the ring, and a group having a nitrogen atom and a sulfur atom as heteroatoms included in the atoms constituting the ring.

Examples of the nitrogen-containing aromatic heterocyclic group having only a nitrogen atom as a heteroatom included in the atoms constituting the ring include a group having a pyrrole ring, a group having an imidazole ring, a group having a pyrazole ring, a group having a pyridine ring, a group having a pyridazine ring, a group having a pyrimidine ring, a group having a pyrazine ring, a group having a quinoline ring, a group having an isoquinoline ring, a group having a cinnoline ring, a group having a quinazoline ring, and a group having a phthalazine ring.

Examples of the group having a pyrrole ring include a 2-pyrrolyl group, a 3-pyrrolyl group, a 1-alkyl-2-pyrrolyl group, and a 1-alkyl-3-pyrrolyl group. Examples of the group having an imidazole ring include a 2-imidazolyl group, a 4-imidazolyl group, a 5-imidazolyl group, a 1-alkyl-2-imidazolyl group, a 1-alkyl-4-imidazolyl group, and a 1-alkyl-5-imidazolyl group. Examples of the group having a pyrazole ring include a 3-pyrazolyl group, a 4-pyrazolyl group, a 5-pyrazolyl group, a 1-alkyl-3-pyrazolyl group, a 1-alkyl-4-pyrazolyl group, and a 1-alkyl-5-pyrazolyl group. Examples of the group having a pyridine ring include a 2-pyridyl group, a 3-pyridyl group, and a 4-pyridyl group. Examples of the group having a pyridazine ring include a 3-pyridazyl group and a 4-pyridazyl group. Examples of the group having a pyrimidine ring include a 2-pyrimidyl group, a 4-pyrimidyl group, and a 5-pyrimidyl group. Examples of the group having a pyrazine ring include a 2-pyrazyl group. Examples of the group having a quinoline ring include a 2-quinolyl group, a 3-quinolyl group, a 4-quinolyl group, a 5-quinolyl group, a 6-quinolyl group, a 7-quinolyl group, and an 8-quinolyl group. Examples of the group having an isoquinoline ring include a 1-isoquinolyl group, a 3-isoquinolyl group, a 4-isoquinolyl group, a 5-isoquinolyl group, a 6-isoquinolyl group, a 7-isoquinolyl group, and an 8-isoquinolyl group. Examples of the group having a cinnoline ring include a 3-cinnolinyl group, a 4-cinnolinyl group, a 5-cinnolinyl group, a 6-cinnolinyl group, a 7-cinnolinyl group, and an 8-cinnolinyl group. Examples of the group having a quinazoline ring include a 2-quinazolinyl group, a 4-quinazolinyl group, a 5-quinazolinyl group, a 6-quinazolinyl group, a 7-quinazolinyl group, and a 8-quinazolinyl group. Examples of the group having a phthalazine ring include a 1-phthalazinyl group, a 5-phthalazinyl group, and a 6-phthalazinyl group. Preferred as the nitrogen-containing aromatic heterocyclic group having only a nitrogen atom as a heteroatom included in the atoms constituting the ring are a group having an imidazole ring, a group having a pyridine ring, and a group having a quinoline ring.

Examples of the nitrogen-containing aromatic heterocyclic group having a nitrogen atom and an oxygen atom as heteroatoms included in the atoms constituting the ring include a group having an oxazole ring and a group having an isooxazole ring.

Examples of the group having an oxazole ring include a 2-oxazolyl group, a 4-oxazolyl group, and a 5-oxazolyl group. Examples of the group having an isooxazole ring include a 3-isoxazolyl group, a 4-isoxazolyl group, and a 5-isoxazolyl group. Preferred as the nitrogen-containing aromatic heterocyclic group having a nitrogen atom and an oxygen atom as heteroatoms included in the atoms constituting the ring is a group having an oxazole ring.

Examples of the nitrogen-containing aromatic heterocyclic group having a nitrogen atom and a sulfur atom as heteroatoms included in the atoms constituting the ring include a group having a thiazole ring and a group having an isothiazole ring.

Examples of the group having a thiazole ring include a 2-thiazolyl group, a 4-thiazolyl group, and a 5-thiazolyl group. Examples of the group having an isothiazole ring include a 3-isothiazolyl group, a 4-isothiazolyl group, and a 5-isothiazolyl group. Preferred as the nitrogen-containing aromatic heterocyclic group having a nitrogen atom and a sulfur atom as heteroatoms included in the atoms constituting the ring is a group having a thiazole ring.

The nitrogen-containing aromatic heterocyclic group represented by $A^5$ is preferably a nitrogen-containing aromatic heterocyclic group having only a nitrogen atom as a heteroatom included in the atoms constituting the ring, more preferably a group having an imidazole ring, a group having a pyridine ring, or a group having a quinoline ring, and even more preferably a group having a pyridine ring.

The compound represented by formula (5) is preferably a group represented by the following formula (5-4) wherein $R^5$ is a group represented by formula (5-1a):

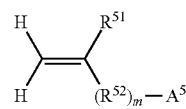

(5-4)

wherein $R^{51}$ represents a hydrogen atom or a hydrocarbyl group, m represents an integer of 0 or 1, $R^{52}$ represents a hydrocarbylene group, and $A^5$ represents a substituted amino group or a nitrogen-containing heterocyclic group.

Of the compounds represented by formula (5-4), examples of the compound wherein $R^{51}$ is a hydrogen atom, m is 0, and $A^5$ is a substituted amino group include the following compounds:
1-vinylpyrrolidine,
1-vinylpiperidine,
1-vinylhexamethyleneimine,
1-vinylpiperazine,
1-vinylpyrrole, and
1-vinylimidazole.

Of the compounds represented by formula (5-4), examples of the compound wherein $R^{51}$ is a hydrogen atom, m is 1, $R^{52}$ is a phenylene group, and $A^5$ is a substituted amino group include the following compounds:
4-dimethylaminostyrene,
4-diethylaminostyrene,
4-dipropylaminostyrene,
4-dibutylaminostyrene,
4-diallylaminostyrene,
4-bis(trimethylsilyl)aminostyrene,
4-bis(tert-butyl-dimethylsilyl)aminostyrene,
4-(1-aziridinyl)styrene,
4-(1-pyrrolidinyl)styrene, 4-(1-piperidinyl)styrene,
4-(1-hexamethyleneimino)styrene,
3-dimethylaminostyrene,
3-diethylaminostyrene,
3-dipropylaminostyrene,
3-dibutylaminostyrene,
3-diallylaminostyrene,
3-bis(trimethylsilyl)aminostyrene,
3-bis(tert-butyl-dimethylsilyl)aminostyrene,
3-(1-aziridinyl)styrene,
3-(1-pyrrolidinyl)styrene,
3-(1-piperidinyl)styrene, and
3-(1-hexamethyleneimino)styrene.

Of the compounds represented by formula (5-4), examples of the compound wherein $R^{51}$ is a hydrogen atom, m is 1, $R^{52}$ is a group represented by formula (5-2a), and $A^5$ is a substituted amino group include the following compounds.

Compounds of formula (5-2a) wherein p is 1:
4-(dimethylaminomethyl)styrene,
4-(diethylaminomethyl)styrene,
4-(dipropylaminomethyl)styrene,
4-(dibutylaminomethyl)styrene,
4-(diallylaminomethyl)styrene,
4-[bis(trimethylsilyl)aminomethyl]styrene,
4-[bis(tert-butyl-dimethylsilyl)aminomethyl]styrene,
4-(1-aziridinyl)methylstyrene,
4-(1-pyrrolidinyl)methylstyrene,
4-(1-piperidinyl)methylstyrene, and
4-(1-hexamethyleneimino)methylstyrene.

Compounds of formula (5-2a) wherein p is 2:
4-[2-(dimethylamino)ethyl]styrene,
4-[2-(diethylamino)ethyl]styrene,
4-[2-(dipropylamino)ethyl]styrene,
4-[2-(dibutylamino)ethyl]styrene,
4-[2-(diallylamino)ethyl]styrene,
4-{2-[bis(trimethylsilyl)amino]ethyl}styrene,
4-{2-[bis(tert-butyl-dimethylsilyl)amino]ethyl}styrene,
4-[2-(1-aziridinyl)ethyl]styrene,
4-[2-(1-pyrrolidinyl)ethyl]styrene,
4-[2-(1-piperidinyl)ethyl]styrene, and
4-[2-(1-hexamethyleneimino)ethyl]styrene.

Of the compounds represented by formula (5-4), examples of the compound wherein $R^{51}$ is a hydrogen atom, m is 1, $R^{52}$ is a group represented by formula (5-2b), and $A^5$ is a substituted amino group include the following compounds.

Compounds of formula (5-2b) wherein q is 1:
3-(dimethylaminomethyl)styrene,
3-(diethylaminomethyl)styrene,
3-(dipropylaminomethyl)styrene,
3-(dibutylaminomethyl)styrene,
3-(diallylaminomethyl)styrene,
3-[bis(trimethylsilyl)aminomethyl]styrene,
3-[bis(tert-butyl-dimethylsilyl)aminomethyl]styrene,
3-(1-aziridinyl)methylstyrene,
3-(1-pyrrolidinyl)methylstyrene,
3-(1-piperidinyl)methylstyrene, and
3-(1-hexamethyleneimino)methylstyrene.

Compounds of formula (5-2b) wherein q is 2:
3-[2-(dimethylamino)ethyl]styrene,
3-[2-(diethylamino)ethyl]styrene,
3-[2-(dipropylamino)ethyl]styrene,
3-[2-(dibutylamino)ethyl]styrene,
3-[2-(diallylamino)ethyl]styrene,
3-{2-[bis(trimethylsilyl)amino]ethyl}styrene,
3-{2-[bis(tert-butyl-dimethylsilyl)amino]ethyl}styrene,
3-[2-(1-aziridinyl)ethyl]styrene,
3-[2-(1-pyrrolidinyl)ethyl]styrene,
3-[2-(1-piperidinyl)ethyl]styrene, and
3-[2-(1-hexamethyleneimino)ethyl]styrene.

Of the compounds represented by formula (5-4), examples of the compound wherein $R^{51}$ is a methyl group, m is 0, and $A^5$ is a substituted amino group include the following compounds:
1-isopropenylpyrrolidine,
1-isopropenylpiperidine,
1-isopropenylhexamethyleneimine,
1-isopropenylpiperazine,
1-isopropenylpyrrole, and
1-isopropenylimidazole.

Of the compounds represented by formula (5-4), examples of the compound wherein $R^{51}$ is a methyl group, m is 1, $R^{52}$ is a phenylene group, and $A^5$ is a substituted amino group include the following compounds:
4-dimethylamino-1-isopropenylbenzene,
4-diethylamino-1-isopropenylbenzene,
4-(dipropylamino)-1-isopropenylbenzene,
4-(dibutylamino)-1-isopropenylbenzene,
4-diallyiamino-1-isopropenylbenzene,
4-bis(trimethylsilyl)amino-1-isopropenylbenzene,
4-bis(tert-butyl-dimethylsilyl)amino-1-isopropenylbenzene,
4-(1-aziridinyl)-1-isopropenylbenzene,
4-(1-pyrrolidinyl)-1-isopropenylbenzene,
4-(1-piperidinyl)-1-isopropenylbenzene,
4-(1-hexamethyleneimino)-1-isopropenylbenzene,
3-dimethylamino-1-isopropenylbenzene,
3-diethylamino-1 isopropenylbenzene,
3-dipropylamino-1-isopropenylbenzene,
3-dibutylamino-1-isopropenylbenzene,
3-diallylamino-1-isopropenylbenzene,
3-bis(trimethylsilyl)amino-1-isopropenylbenzene,
3-bis(tert-butyl-dimethylsilyl)amino-1-isopropenylbenzene,
3-(1-aziridinyl)-1-isopropenylbenzene,
3-(1-pyrrolidinyl)-1-isopropenylbenzene,
3-(1-piperidinyl)-1-isopropenylbenzene, and
3-(1-hexamethyleneimino)-1-iisopropenylbenzene.

Of the compounds represented by formula (5-4), examples of the compound wherein $R^{51}$ is a methyl group, m is 1, $R^{52}$ is a group represented by formula (5-2a), and $A^5$ is a substituted amino group include the following compounds.

Compounds of formula (5-2a) wherein p is 1:
4-dimethylaminomethyl-1-isopropenylbenzene,
4-diethylaminomethyl-1-isopropenylbenzene,
4-di-n-propylaminomethyl-1-isopropenylbenzene,
4-di-n-butylaminomethyl-1-isopropenylbenzene,
4-diallylaminomethyl-1-isopropenylbenzene,
4-bis(trimethylsilyl)aminomethyl-1-isopropenylbenzene,
4-bis(tert-butyl-dimethylsilyl)aminomethyl-1-isopropenylbenzene,
4-(1-aziridinyl)methyl-1-isopropenylbenzene,
4-(1-pyrrolidinyl)methyl-1-isopropenylbenzene,
4-(1-piperidinyl)methyl-1-isopropenylbenzene, and
4-(1-hexamethyleneimino)methyl-1-isopropenylbenzene.

Compounds of formula (5-2a) wherein p is 2:
4-[2-(dimethylamino)ethyl]-1-isopropenylbenzene,
4-[2-(diethylamino)ethyl]-1-isopropenylbenzene,
4-[2-(dipropylamino)ethyl]-1-isopropenylbenzene,
4-[2-(dibutylamino)ethyl]-1-isopropenylbenzene,
4-[2-(diallylamino)ethyl]-1-isopropenylbenzene,
4-{2-[bis(trimethylsilyl)amino]ethyl}-1-isopropenylbenzene,
4-{2-[bis(tert-butyl-dimethylsilyl)amino]ethyl}-1-isopropenylbenzene,
4-[2-(1-aziridinyl)ethyl]-1-isopropenylbenzene,
4-[2-(1-pyrrolidinyl)ethyl]-1-isopropenylbenzene, 4-[2-(1-piperidinyl)ethyl]-1-isopropenylbenzene, and
4-[2-(1-hexamethyleneimino)ethyl]-1-isopropenylbenzene.

Of the compounds represented by formula (5-4), examples of the compound wherein $R^{51}$ is a methyl group, m is 1, $R^{52}$ is a group represented by formula (5-2b), and $A^5$ is a substituted amino group include the following compounds.

Compounds of formula (5-2b) wherein g is 1:
3-dimethylaminomethyl-1-isopropenylbenzene,
3-diethylaminomethyl-1-isopropenylbenzene,
3-dipropylaminomethyl-1-isopropenylbenzene,
3-dibutylaminomethyl-1-isopropenylbenzene,
3-diallylaminomethyl-1-isopropenylbenzene,
3-bis(trimethylsilyl)aminomethyl-1-isopropenylbenzene,
3-bis(tert-butyl-dimethylsilyl)aminomethyl-1-isopropenylbenzene,
3-(1-aziridinyl)methyl-1-isopropenylbenzene,
3-(1-pyrrolidinyl)methyl-1-isopropenylbenzene,
3-(1-piperidinyl)methyl-1-isopropenylbenzene, and
3-(1-hexamethyleneimino)methyl-1-isopropenylbenzene.

Compounds of formula (5-2b) wherein q is 2:
3-[2-(dimethylamino)ethyl]-1-isopropenylbenzene,
3-[2-(diethylamino)ethyl]-1-isopropenylbenzene,
3-[2-(dipropylamino)ethyl]-1-isopropenylbenzene,
3-[2-(di-n-butylamino)ethyl]-1-isopropenylbenzene,
3-[2-(diallylamino)ethyl]-1-isopropenylbenzene,
3-{2-[bis(trimethylsilyl)amino]ethyl}-1-isopropenylbenzene,
3-{2-[bis(tert-butyl-dimethylsilyl)amino]ethyl}-1-isopropenylbenzene,
3-[2-(1-aziridinyl)ethyl]-1-isopropenylbenzene
3-[2-(1-pyrrolidinyl)ethyl]-1-isopropenylbenzene,
3-[2-(1-piperidinyl)ethyl]-1-isopropenylbenzene, and
3-[2-(1-hexamethyleneimino)ethyl]-1-isopropenylbenzene.

Of the compounds represented by formula (5-4), examples of the compound wherein $R^{51}$ is a vinyl group, m is 0, and $A^5$ is a substituted amino group include the following compounds:
2-dimethylamino-1,3-butadiene,
2-diethylamino-1,3-butadiene,
2-(dipropylamino)-1,3-butadiene,
2-(dibutylamino)-1,3-butadiene,
2-diallylamino-1,3-butadiene,
2-[bis(trimethylsilyl)amino]-1,3-butadiene,
2-[bis(tert-butyl-dimethylsilyl)amino]-1,3-butadiene,
2-(1-aziridinyl)-1,3-butadiene,
2-(1-pyrrolidinyl)-1,3-butadiene,
2-(1-piperidinyl)-1,3-butadiene,
2-(1-hexamethyleneimino)-1,3-butadiene,
2-(1-pyrrolyl)-1,3-butadiene, and
2-(1-imidazolyl)-1,3-butadiene.

Of the compounds represented by formula (5-4), examples of the compound wherein $R^{51}$ is a vinyl group, m is 1, $R^{52}$ is an alkylene group, and $A^5$ is a substituted amino group include the following compounds.

Compounds wherein $R^{52}$ is a methylene group:
2-dimethylaminomethyl-1,3-butadiene,
2-diethylaminomethyl-1,3-butadiene,
2-(di-n-propylaminomethyl)-1,3-butadiene,
2-(di-n-butylaminomethyl)-1,3-butadiene,
2-diallylaminomethyl-1,3-butadiene,
2-bis(trimethylsilyl)aminomethyl]-1,3-butadiene,
2-[bis(tert-butyl-dimethylsilyl)aminomethyl]-1,3-butadiene,
2-[(1-aziridinyl)methyl]-1,3-butadiene,
2-[(1-pyrrolidinyl)methyl]-1,3-butadiene,
2-[(1-piperidinyl)methyl]-1,3-butadiene,
2-[(1-hexamethyleneimino)methyl]-1,3-butadiene,
1-(2-methylene-3-butenyl)pyrrole, and
1-(2-methylene-3-butenyl)imidazole Compounds wherein $R^{52}$ is an ethylene group:
5-dimethylamino-3-methylene-1-pentene,
5-diethylamino-3-methylene-1-pentene,
5-(di-n-propylamino)-3-methylene-1-pentene,
5-(di-n-butylamino)-3-methylene-1-pentene,
5-diallylamino-3-methylene-1-pentene,
5-bis(trimethylsilyl)amino-3-methylene-1-pentene,
5-bis(tert-butyl-dimethylsilyl)amino-3-methylene-1-pentene,
5-(1-aziridinyl)-3-methylene-1-pentene,
5-(1-pyrrolidinyl)-3-methylene-1-pentene,
5-(1-piperidinyl)-3-methylene-1-pentene,
5-(1-hexamethyleneimino)-3-methylene-1-pentene,
1-(3-methylene-4-pentenyl)pyrrole, and
1-(3-methylene-4-pentenyl)imidazole.

Of the compounds represented by formula (5-4), examples of the compound wherein $R^{51}$ is a phenyl group, m is 1, $R^{52}$ is a phenylene group, and $A^5$ is a substituted amino group include the following compounds:
1-(4-dimethylaminophenyl)-1-phenylethylene,
1-(4-diethylaminophenyl)-1-phenylethylene,
1-(4-dipropylaminophenyl)-1-phenylethylene,
1-(4-diisopropylaminophenyl)-1-phenylethylene,
1-(4-dibutylaminophenyl)-1-phenylethylene,
1-(4-diisobutylaminophenyl)-1-phenylethylene,
1-(4-di-tert-butylaminophenyl)-1-phenylethylene,
1-(4-diphenylaminophenyl)-1-phenylethylene,
1-[4-(1-aziridinyl)phenyl]-1-phenylethylene,
1-[4-(1-pyrrolidinyl)phenyl]-1-phenylethylene,
1-[4-(1-piperidinyl)phenyl]-1-phenylethylene,
1-[4-(1-hexamethyleneimino)phenyl]-1-phenylethylene,
1-(4-morpholinophenyl)-1-phenylethylene,
1-{4-[bis(trimethylsilyl)amino]phenyl}-1-phenylethylene,
1-{4-[bis(tert-butyl-dimethylsilyl)amino]phenyl}-1-phenylethylene,
1-{4-[bis(triisopropylsilyl)amino]phenyl}-1-phenylethylene,
1-(3-dimethylaminophenyl)-1-phenylethylene,
1-(3-diethylaminophenyl)-1-phenylethylene,
1-(3-dipropylaminophenyl)-1-phenylethylene,
1-(3-diisopropylaminophenyl)-1-phenylethylene,
1-(3-dibutylaminophenyl)-1-phenylethylene,
1-(3-diisobutylaminophenyl)-1-phenylethylene,
1-(3-di-tert-butylaminophenyl)-1-phenylethylene,
1-(3-diphenylaminophenyl)-1-phenylethylene,
1-[3-(1-aziridinyl)phenyl]-1-phenylethylene,
1-[3-(1-pyrrolidinyl)phenyl]-1-phenylethylene,
1-[3-(1-piperidinyl)phenyl]-1-phenylethylene,
1-[3-(1-hexamethyleneimino)phenyl]-1-phenylethylene,
1-(3-morpholinophenyl)-1-phenylethylene,
1-{3-[bis(trimethylsilyl)amino]phenyl}-1-phenylethylene,
1-{3-[bis(tert-butyl-dimethylsilyl)amino]phenyl}-1-phenylethylene, and
1-{3-[bis(triisopropylsilyl)amino]phenyl}-1-phenylethylene.

Of the compounds represented by formula (5-4), examples of the compound wherein which $R^{51}$ is a phenyl group, m is 1, $R^{52}$ is a group represented by formula (5-2a), and $A^5$ is a substituted amino group include the following compounds.

Compounds of formula (5-2a) wherein p is 1:
1-[4-(dimethylaminomethyl)phenyl]-1-phenylethylene,
1-[4-(diethylaminomethyl)phenyl]-1-phenylethylene,
1-[4-(dipropylaminomethyl)phenyl]-1-phenylethylene,
1-[4-(diisopropylaminomethyl)phenyl]-1-phenylethylene,
1-[4-(dibutylaminomethyl)phenyl]-1-phenylethylene,
1-[4-(diisobutylaminomethyl)phenyl]-1-phenylethylene, 1-[4-(di-tert-butylaminomethyl)phenyl]-1-phenylethylene,
1-[4-(diphenylaminomethyl)phenyl]-1-phenylethylene,
1-[4-(1-aziridinylmethyl)phenyl]-1-phenylethylene,
1-[4-(1-pyrrolidinylmethyl)phenyl]-1-phenylethylene,
1-[4-(1-piperidinylmethyl)phenyl]-1-phenylethylene,
1-[4-(1-hexamethyleneiminomethyl)phenyl]-1-phenylethylene,
1-(4-morpholinomethylphenyl)-1-phenylethylene,
1-{4-[bis(trimethylsilyl)aminomethyl]phenyl}-1-phenylethylene,
1-{4-[bis(tert-butyl-dimethylsilyl)aminomethyl]phenyl}-phenylethylene, and
1-{4-[bis(triisopropylsilyl)aminomethyl]phenyl}-1-phenylethylene.

Of the compounds represented by formula (5-4), examples of the compound wherein $R^{51}$ is a phenyl group, m is 1, $R^{52}$ is a group represented by formula (5-2b), and $A^5$ is a substituted amino group include the following compounds.

Compounds of formula (5-2b) wherein q is 1:
1-[3-(dimethylaminomethyl)phenyl]-1-phenylethylene,
1-[3-(diethylaminomethyl)phenyl]-1-phenylethylene,
1-[3-(dipropylaminomethyl)phenyl]-1-phenylethylene,
1-[3-(diisopropylaminomethyl)phenyl]-1-phenylethylene,
1-[3-(dibutylaminomethyl)phenyl]-1-phenylethylene,
1-[3-(diisobutylaminomethyl)phenyl]-1-phenylethylene,
1-[3-(di-tert-butylaminomethyl)phenyl]-1-phenylethylene,
1-[3-(diphenylaminomethyl)phenyl]-1-phenylethylene,
1-[3-(1-aziridinylmethyl)phenyl]-1-phenylethylene,
1-[3-(1-pyrrolidinylmethyl)phenyl]-1-phenylethylene,
1-[3-(1-piperidinylmethyl)phenyl]-1-phenylethylene,
1-[3-(1-hexamethyleneiminomethyl)phenyl]-1-phenylethylene,
1-(3-morpholinomethylphenyl)-1-phenylethylene,
1-{3-[bis(trimethylsilyl)aminomethyl]phenyl}-1-phenylethylene,
1-{3-[bis(tert-butyl-dimethylsilyl)aminomethyl]phenyl}-1-phenylethylene, and
1-{3-[bis(triisopropylsilyl)aminomethyl]phenyl}-1-phenylethylene.

Of the compounds represented by formula (5-4), examples of the compound wherein $R^{51}$ is a hydrogen atom, m is 0, and $A^5$ is a nitrogen-containing heteroalicyclic group include the following compounds:
1-methyl-3-vinylpyrrolidine,
1-methyl-4-vinylpiperidine,
1-methyl-3-vinylhexamethyleneimine, and
1-methyl-4-vinylhexamethyleneimine.

Of the compounds represented by formula (5-4), examples of the compound wherein $R^{51}$ is a hydrogen atom, m is 1, $R^{52}$ is a phenylene group, and $A^5$ is a nitrogen-containing heteroalicyclic group include the following compounds:
1-methyl-3-(4-vinylphenyl)pyrrolidine,
1-methyl-4-(4-vinylphenyl)piperidine,
1-methyl-3-(4-vinylphenyl)hexamethyleneimine,
1-methyl-4-(4-vinylphenyl)hexamethyleneimine,
1-methyl-3-(3-vinylphenyl)pyrrolidine,
1-methyl-4-(3-vinylphenyl)piperidine,
1-methyl-3-(3-vinylphenyl)hexamethyleneimine, and
1-methyl-4-(3-vinylphenyl)hexamethyleneimine.

Of the compounds represented by formula (5-4), examples of the compound wherein $R^{51}$ is a hydrogen atom, m is 1, $R^{52}$ is a group represented by formula (5-2a), and $A^5$ is a nitrogen-containing heteroalicyclic group include the following compounds.

Compounds of formula (5-2a) wherein p is 1:
1-methyl-3-(4-vinylphenylmethyl)pyrrolidine,
1-methyl-4-(4-vinylphenylmethyl)piperidine,
1-methyl-3-(4-vinylphenylmethyl)hexamethyleneimine, and
1-methyl-4-(4-vinylphenylmethyl)hexamethyleneimine.

Compounds of formula (5-2a) wherein p is 2:
1-methyl-3-[2-(4-vinylphenyl)ethyl]pyrrolidine,
1-methyl-4-[2-(4-vinylphenyl)ethyl]piperidine,
1-methyl-3-[2-(4-vinylphenyl)ethyl]hexamethyleneimine, and
1-methyl-4-[2-(4-vinylphenyl)ethyl]hexamethyleneimine.

Of the compounds represented by formula (5-4), examples of the compound wherein $R^{51}$ is a hydrogen atom, m is 1, $R^{52}$ is a group represented by formula (5-2b), and $A^5$ is a nitrogen-containing heteroalicyclic group include the following compounds.

Compounds of formula (5-2b) wherein q is 1:
1-methyl-3-(3-vinylphenylmethyl)pyrrolidine,
1-methyl-4-(3-vinylphenylmethyl)piperidine,
1-methyl-3-(3-vinylphenylmethyl)hexamethyleneimine, and
1-methyl-4-(3-vinylphenylmethyl)hexamethyleneimine.

Compounds of formula (5-2b) wherein q is 2:
1-methyl-3-[2-(3-vinylphenyl)ethyl]pyrrolidine,
1-methyl-4-[2-(3-vinylphenyl)ethyl]piperidine,
1-methyl-3-[2-(3-vinylphenyl)ethyl]hexamethyleneimine, and
1-methyl-4-[2-(3-vinylphenyl)ethyl]hexamethyleneimine.

Of the compounds represented by formula (5-4), examples of the compound wherein $R^{51}$ is a methyl group, m is 0, and $A^5$ is a nitrogen-containing heteroalicyclic group include the following compounds:
1-methyl-3-isopropenylpyrrolidine,
1-methyl-4-isopropenylpiperidine,
1-methyl-3-isopropenylhexamethyleneimine, and
1-methyl-4-isopropenylhexamethyleneimine.

Of the compounds represented by formula (5-4), examples of the compound wherein $R^{51}$ is a methyl group, m is 1, $R^{52}$ is a phenylene group, and $A^5$ is a nitrogen-containing heteroalicyclic group include the following compounds:
1-methyl-3-(4-isopropenylphenyl)pyrrolidine,
1-methyl-4-(4-isopropenylphenyl)piperidine,
1-methyl-3-(4-isopropenylphenyl)hexamethyleneimine, and
1-methyl-4-(4-isopropenylphenyl)hexamethyleneimine.

Of the compounds represented by formula (5-4), examples of the compound wherein $R^{51}$ is a methyl group, m is 1, $R^{52}$ is a group represented by formula (5-2a), and $A^5$ is a nitrogen-containing heteroalicyclic group include the following compounds.

Compounds of formula (5-2a) wherein p is 1:
1-methyl-3-(4-isopropenylphenylmethyl)pyrrolidine,
1-methyl-4-(4-isopropenylphenylmethyl)piperidine,
1-methyl-3-(4-isopropenylphenylmethyl)hexamethyleneimine, and
1-methyl-4-(4-isopropenylphenylmethyl)hexamethyleneimine.

Compounds of formula (5-2a) wherein p is 2:
1-methyl-3-[2-(4-isopropenyiphenyl)ethyl]pyrrolidine,
1-methyl-4-[2-(4-isopropenylphenyl)ethyl]piperidine,
1-methyl-3-[2-(4-isopropenylphenyl)ethyl]hexamethyleneimine, and
1-methyl-4-[2-(4-isopropenylphenyl)ethyl]hexamethyleneimine.

Of the compounds represented by formula (5-4), examples of the compound wherein $R^{51}$ is a vinyl group, m is 0, and $A^5$ is a nitrogen-containing heteroalicyclic group include the following compounds:
1-methyl-3-(1-methylene-2-propenyl)pyrrolidine,
1-methyl-4-(1-methylene-2-propenyl)piperidine,
1-methyl-3-(1-methylene-2-propenyl)hexamethyleneimine, and 1-methyl-4-(1-methylene-2-propenyl)hexamethyleneimine.

Of the compounds represented by formula (5-4), examples of the compound wherein $R^{51}$ is a vinyl group, m is 1, $R^{52}$ is an alkylene group, and $A^5$ is a nitrogen-containing heteroalicyclic group include the following compounds.

Compounds wherein $R^{52}$ is a methylene group:
1-methyl-3-(2-methylene-3-butenyl)pyrrolidine,
1-methyl-4-(2-methylene-3-butenyl)piperidine,
1-methyl-3-(2-methylene-3-butenyl)hexamethyleneimine, and
1-methyl-4-(2-methylene-3-butenyl)hexamethyleneimine.

Compounds wherein $R^{52}$ is an ethylene group:
1-methyl-3-(3-methylene-4-pentenyl)pyrrolidine
1-methyl-4-(3-methylene-4-pentenyl)piperidine,
1-methyl-3-(3-methylene-4-pentenyl)hexamethyleneimine, and
1-methyl-4-(3-methylene-4-pentenyl)hexamethyleneimine.

Of the compounds represented by formula (5-4), examples of the compound wherein $R^{51}$ is a phenyl group, m is 1, $R^{52}$ is a phenylene group, and $A^5$ is a nitrogen-containing heteroalicyclic group include the following compounds:
1-[4-(1-methyl-3-pyrrolidinyl)phenyl]-1-phenylethylene,
1-[4-(1-methyl-3-piperidinyl)phenyl]-1-phenylethylene,
1-[4-(1-methyl-4-piperidinyl)phenyl]-1-phenylethylene,
1-[4-(1-methyl-3-hexamethyleneimino)phenyl]-1-phenylethylene,
1-[4-(1-methyl-4-hexamethyleneimino)phenyl]-1-phenylethylene,
1-[3-(1-methyl-3-pyrrolidinyl)phenyl]-1-phenylethylene,
1-[3-(1-methyl-3-piperidinyl)phenyl]-1-phenylethylene,
1-[3-(1-methyl-4-piperidinyl)phenyl]-1-phenylethylene,
1-[3-(1-methyl-3-hexamethyleneimino)phenyl]-1-phenylethylene, and
1-[3-(1-methyl-4-hexamethyleneimino)phenyl]-1-phenylethylene.

Of the compounds represented by formula (5-4), examples of the compound wherein $R^{51}$ is a phenyl group, m is 1, $R^{52}$ is a group represented by formula (5-2a), and $A^5$ is a nitrogen-containing heteroalicyclic group include the following compounds.

Compounds of formula (5-2a) wherein p is 1:
1-[4-(1-methyl-3-pyrrolidinyl)methyl]phenyl}-1-phenylethylene,
1-[4-(1-methyl-3-piperidinyl)methyl]phenyl}-1-phenylethylene,
1-[4-(1-methyl-4-piperidinyl)methyl]phenyl}-1-phenylethylene, and
1-[4-(1-methyl-3-hexamethyleneimino)methyl]phenyl}-1-phenylethylene.

Of the compounds represented by formula (5-4), examples of the compound wherein $R^{51}$ is a phenyl group, m is 1, $R^{52}$ is a group represented by formula (5-2b), and A is a nitrogen-containing heteroalicyclic group include the following compounds.

Compounds of formula (5-2b) wherein q is 1:
1-[3-(1-methyl-3-pyrrolidinyl)methyl]phenyl}-1-phenylethylene,
1-[3-(1-methyl-3-piperidinyl)methyl]phenyl}-1-phenylethylene,
1-[3-(1-methyl-4-piperidinyl)methyl]phenyl}-1-phenylethylene, and
1-[3-(1-methyl-3-hexamethyleneimino)methyl]phenyl}-1-phenyl ethylene.

Of the compounds represented by formula (5-4), examples of the compound wherein $R^{51}$ is a hydrogen atom, m is 0, and $A^5$ is a nitrogen-containing aromatic heterocyclic group include the following compounds:
1-methyl-2-vinylimidazole,
1-methyl-4-vinylimidazole,
1-methyl-5-vinylimidazole,
2-vinylpyridine,
3-vinylpyridine,
4-vinylpyridine,
2-vinylquinoline,
3-vinylquinoline, and
4-vinylquinoline.

Of the compounds represented by formula (5-4), examples of the compound wherein $R^{51}$ is a methyl group, m is 0, and $A^5$ is a nitrogen-containing aromatic heterocyclic group include the following compounds:
1-methyl-2-isopropenylimidazole,
1-methyl-4-isopropenylimidazole,
1-methyl-5-isopropenylimidazole,
2-isopropenylpyridine,
3-isopropenylpyridine,
4-isopropenylpyridine,
2-isopropenylquinoline,
3-isopropenylquinoline, and
4-isopropenylquinoline.

Of the compounds represented by formula (5-4), examples of the compound wherein $R^{51}$ is a vinyl group, m is 0, and $A^5$ is a nitrogen-containing aromatic heterocyclic group include the following compounds:
1-methyl-2-(1-methylene-2-propenyl)imidazole,
1-methyl-4-(1-methylene-2-propenyl)imidazole,
1-methyl-5-(1-methylene-2-propenyl)imidazole,
2-(1-methylene-2-propenyl)pyridine,
3-(1-methylene-2-propenyl)pyridine,
4-(1-methylene-2-propenyl)pyridine,
2-(1-methylene-2-propenyl)quinoline,
3-(1-methylene-2-propenyl)quinoline, and
4-(1-methylene-2-propenyl)quinoline.

Of the compounds represented by formula (5-4), examples of the compound wherein $R^{51}$ is a vinyl group, m is 1, $R^{52}$ is an alkylene group, and $A^5$ is a nitrogen-containing aromatic heterocyclic group include the following compounds.

Compounds wherein $R^{52}$ is a methylene group:
1-methyl-2-(2-methylene-3-butenyl)imidazole,
1-methyl-4-(2-methylene-3-butenyl)imidazole,
1-methyl-5-(2-methylene-3-butenyl)imidazole,
2-(2-methylene-3-butenyl)pyridine,
3-(2-methylene-3-butenyl)pyridine,
4-(2-methylene-3-butenyl)pyridine,
2-(2-methylene-3-butenyl)quinoline,
3-(2-methylene-3-butenyl)quinoline, and
4-(2-methylene-3-butenyl)quinoline.

Compounds wherein $R^{52}$ is an ethylene group:
1-methyl-2-(3-methylene-4-pentenyl)imidazole,
1-methyl-4-(3-methylene-4-pentenyl)imidazole,
1-methyl-5-(3-methylene-4-pentenyl)imidazole,
2-(3-methylene-4-pentenyl)pyridine,
3-(3-methylene-4-pentenyl)pyridine,
4-(3-methylene-4-pentenyl)pyridine,
2-(3-methylene-4-pentenyl)quinoline,
3-(3-methylene-4-pentenyl)quinoline, and
4-(3-methylene-4-pentenyl)quinoline, Preferred as the compound represented by formula (5) is a compound represented by formula (5-4) wherein $R^{51}$ in formula (5-4) is a hydrogen atom.

More preferred are a compound represented by formula (5-4) wherein $R^{51}$ in formula (5-4) is a hydrogen atom, m is 1, $R^{52}$ is a phenylene group, and $A^5$ is a substituted amino group represented by formula (5-3); a compound represented by formula (5-4) wherein $R^{51}$ in formula (5-4) is a hydrogen atom, m is 1, $R^{52}$ is a group represented by formula (5-2), and $A^5$ is a substituted amino group represented by formula (5-3); and a compound represented by formula (5-4) wherein $R^{51}$ in formula (5-4) is a hydrogen atom, m is 0, and $A^5$ is a nitrogen-containing heterocyclic group.

Even more preferred are a compound represented by formula (5-4) wherein $R^{51}$ in formula (5-4) is a hydrogen atom, m is 1, $R^{52}$ is a para-phenylene group or a meta-phenylene group, and $A^5$ is a polymethylene group in which $R^{55}$ and $R^{56}$ in formula (5-3) are bonded to each other; a compound represented by formula (5-4) wherein $R^{51}$ in formula (5-4) is a hydrogen atom, m is 1, $R^{52}$ is a group represented by formula (5-2a) or (5-2b), and $A^5$ is a polymethylene group in which $R^{55}$ and $R^{56}$ in formula (5-3) are bonded to each other; and a compound represented by formula (5-4) wherein $R^{51}$ in formula (5-4) is a hydrogen atom, a is 0, and $A^5$ is a nitrogen-containing aromatic heterocyclic group.

Particularly preferred as the compound represented by formula (5) are 4-[2-(1-pyrrolidinyl)ethyl]styrene, 3-[2-(1-pyrrolidinyl)ethyl]styrene, 4-vinylpyridine, and 3-vinylpyridine.

$R^9$ in formula (5') represents a hydrocarbyl group having a polymerizable carbon-carbon double bond.

$R^9$ is preferably a group represented by the following formula (5-V):

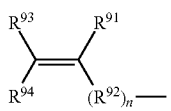

(5'-V)

wherein n represents an integer of 0 or 1, $R^{91}$, $R^{93}$, and $R^{94}$ each independently represent a hydrogen atom or a hydrocarbyl group, and $R^{92}$ represents a hydrocarbylene group.

In formula (5'-V), n represents an integer of 0 or 1.

Examples of the hydrocarbyl group represented by $R^{91}$, $R^{93}$, or $R^{94}$ include an alkyl group, an alkenyl group, and an aryl group. Examples of the alkyl group include a methyl group, an ethyl group, a n-propyl group, an isopropyl group, a n-butyl group, a sec-butyl group, and a tert-butyl group, and preferred is a methyl group. Examples of the alkenyl group include a vinyl group, an allyl group, a 1-propenyl group, and an isopropenyl group, and preferred is a vinyl group. Examples of the aryl group include a phenyl group, a methylphenyl group, and an ethylphenyl group, and preferred is a phenyl group.

Preferred as $R^{91}$ is a hydrogen atom, a methyl group, a vinyl group, or a phenyl group, and more preferred is a hydrogen atom.

Preferred as $R^{93}$ and $R^{94}$ is a hydrogen atom.

Examples of the hydrocarbylene group represented by $R^{92}$ include an alkylene group, an arylene group, and a group in which an arylene group is bonded to an alkylene group.

Examples of the alkylene group include a methylene group, an ethylene group, and a trimethylene group. Preferred is a methylene group or an ethylene group. Examples of the arylene group include a phenylene group, a naphthylene group, and a biphenylene group. Preferred is a phenylene group.

Examples of the group in which an arylene group is bonded to an alkylene group include a group in which a phenylene group is bonded to an alkylene group, a group in which a naphthylene group is bonded to an alkylene group, and a group in which a biphenylene group is bonded to an alkylene group. Preferred is a group in which a phenylene group is bonded to an alkylene group.

As to the group in which an arylene group is bonded to an alkylene group, a carbon atom of the arylene group is preferably bonded to the carbon atom to which $R^{91}$ of formula (5'-V) is bonded.

Examples of the group in which a phenylene group and an alkylene group are bonded to each other (i.e., a phenylene-alkylene group) include a group represented by the following formula (5'-R):

wherein d represents an integer of 1 to 10, and $(CH_2)_d$ is a substituent on the benzene ring.

Examples of the phenylene-alkylene group include, depending upon the position of the carbon atom on the benzene ring to which the alkylene group is bonded, a para-phenylene-alkylene group, a meta-phenylene-alkylene group, and an ortho-phenylene-alkylene group. In the case of a group represented by formula (5'-R), the para-phenylene-alkylene group is a group represented by the following formula (5'-Ra), the meta-phenylene-alkylene group is a group represented by the following formula (5'-Rb), and the ortho-phenylene-alkylene group is a group represented by the following formula (5'-Rc):

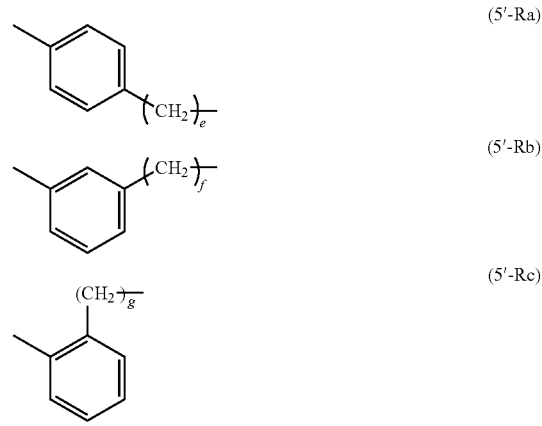

wherein e, f, and g each represent an integer of 1 to 10.

Preferred as the group in which an arylene group is bonded to an alkylene group is a group in which a phenylene group is bonded to an alkylene group (a phenylene-alkylene group), more preferred is a group represented by the above formula (5'-Ra) or a group represented by the above formula (5'-Rb), even more preferred is a para-phenylene-methylene group (a group represented by formula (5'-Ra) wherein e=1), a meta-phenylene-methylene group (a group represented by formula (5'-Rb) wherein f=1), a para-phenylene-ethylene group (a group represented by formula (5'-Ra) wherein e=2), or a meta-phenylene-ethylene group (a group represented by formula (5'-Rb) wherein f=2).

Examples of the group represented formula (5'-V) include the groups shown below.

Examples of the group in which $R^{91}$, $R^{93}$, and $R^{94}$ are hydrogen atoms include a vinyl group, an allyl group, a 3-butenyl group, a 4-vinylphenyl group, a 3-vinylphenyl group, a (4-vinylphenyl)methyl group, a 2-(4-vinylphenyl) ethyl group, a (3 vinylphenyl)methyl group, and a 2-(3-vinylphenyl)ethyl group.

Examples of the group in which $R^{91}$ is a methyl group and $R^{93}$ and $R^{94}$ are hydrogen atoms include an isopropenyl group, a 2-methyl-2-propenyl group, a 4-isopropenylphenyl group, a 3-isopropenylphenyl group, a (4-isopropenylphenyl) methyl group, a 2-(4-isopropenylphenyl)ethyl group, a (3-isopropenylphenyl)methyl group, and a 2-(3-isopropenylphenyl)ethyl group.

Examples of the group in which $R^{91}$ is a vinyl group and $R^{93}$ and $R^{94}$ are hydrogen atoms include a 1-methylene-2-propenyl group and a 2-methylene-3-butenyl group.

Examples of the group in which $R^{91}$ is a phenyl group and $R^{93}$ and $R^{94}$ are hydrogen atoms include a 1-phenylethenyl group, a 2-phenyl-2-propenyl group, a 4-(1-phenylethenyl) phenyl group, a 3-(1-phenylethenyl)phenyl group, and a 2-(1-phenylethenyl)phenyl group.

Examples of the group in which $R^{91}$ is a hydrogen atom, $R^{93}$ is a methyl group, and $R^{94}$ is a hydrogen atom include a 1-propenyl group, a 2-butenyl group, a 4-(1-propenyl)phenyl group, a 4-(1-propenyl)phenylmethyl group, a 2-[4-(1-propenyl)phenyl]ethyl group, a 3-(1-propenyl)phenyl group, a 3-(1-propenyl)phenylmethyl group, and a 2-[3-(1-propenyl) phenyl]ethyl group.

The group represented by formula (5'-V) is preferably a group represented by the following formula (5'-V1):

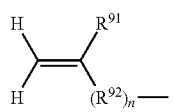

(5'-V1)

wherein $R^{91}$ represents a hydrogen atom or a hydrocarbyl group, n represents an integer of 0 or 1, and $R^{92}$ represents a hydrocarbylene group.

Among preferable groups represented by formula (5'-V1), examples of the group in which $R^{91}$ is a hydrogen atom include a vinyl group, a 4-vinylphenyl group, a 3-vinylphenyl group, a (4-vinylphenyl)methyl group, a 2-(4-vinylphenyl) ethyl group, a (3-vinylphenyl)methyl group, and a 2-(3-vinylphenyl)ethyl group. Examples of the group in which $R^{91}$ is a methyl group include a 4-isopropenylphenyl group, a 3-isopropenylphenyl group, a (4-isopropenylphenyl)methyl group, a 2-(4-isopropenylphenyl)ethyl group, a (3-isopropenylphenyl) methyl group, and a 2-(3-isopropenylphenyl) ethyl group. Examples of the group in which $R^{91}$ is a vinyl group include a 1-methylene-2-propenyl group and a 2-methylene-3-butenyl group. Examples of the group in which $R^{91}$ is a phenyl group include a 4-(1-phenylvinyl)phenyl group.

More preferred as the group represented by formula (5'-V1) is a vinyl group.

$A^9$ in formula (5') represents a substituted silyl group.

Examples of the substituted silyl group represented by $A^9$ include groups in which a hydrogen atom bonded to the silicon atom of a silyl group has been substituted with a substituent such as a hydrocarbyl group optionally having a substituent, a hydrocarbyloxy group, or a substituted amino group. Substituents bonded to the silicon atom may be either the same or different.

Preferred as the substituted silyl group represented by $A^9$ is a group represented by the following formula (5'-S):

(5'-S)

wherein $X^1$, $X^2$, and $X^3$ each represent a substituted amino group or a hydrocarbyl group optionally having a substituent, provided that at least one of $X^1$, $X^2$, and $X^3$ is a substituted amino group.

Examples of the hydrocarbyl group optionally having a substituent represented by $X^1$, $X^2$, or $X^3$ include a hydrocarbyl group and a substituted hydrocarbyl group, and examples of the substituted hydrocarbyl group include a group having at least one atom selected from the atom group consisting of an oxygen atom, a nitrogen atom, and a silicon atom.

Examples of the hydrocarbyl group represented by $X^1$, $X^2$, or $X^3$ include an alkyl group, an alkenyl group, an alkynyl group, an aryl group, and an aralkyl group. Examples of the alkyl group include a methyl group, an ethyl group, a n-propyl group, an isopropyl group, a n-butyl group, a sec-butyl group, and a tert-butyl group. Examples of the alkenyl group include a vinyl group, an allyl group, a 1-propenyl group, and an isopropenyl group. Examples of the alkynyl group include an ethynyl group and a 2-propynyl group. Examples of the aryl group include a phenyl group, a tolyl group, and a xylyl group. Examples of the aralkyl group include a benzyl group. Preferred as the hydrocarbyl group is an alkyl group.

Examples of the substituted hydrocarbyl group having an oxygen atom represented by $X^1$, $X^2$, or $X^3$ include alkoxyalkyl groups such as a methoxymethyl group, a methoxyethyl group, an ethoxymethyl group, and an ethoxyethyl group.

Examples of the substituted hydrocarbyl group having a nitrogen atom represented by $X^1$, $X^2$, or $X^3$ include dialkylaminoalkyl groups such as a dimethylaminomethyl group, a dimethylaminoethyl group, a diethylaminomethyl group, and a diethylaminoethyl group.

Examples of the substituted hydrocarbyl group having a silicon atom represented by $X^1$, $X^2$, or $X^3$ include trialkylsilylalkyl groups such as a trimethylsilylmethyl group, a trimethylsilylethyl group, a triethylsilylmethyl group, and a triethylsilylethyl group.

The number of the carbon atoms of the hydrocarbyl group optionally having a substituent represented by $X^1$, $X^2$, or $X^3$ is preferably 1 to 10, more preferably 1 to 4.

Preferred as the hydrocarbyl group optionally having a substituent represented by $X^1$, $X^2$, or $X^3$ is an alkyl group or an alkoxyalkyl group. Preferred as the alkyl group is an alkyl group having 1 to 4 carbon atoms, and more preferred is a methyl group or an ethyl group. Preferred as the alkoxyalkyl group is an alkoxyalkyl group having 2 to 4 carbon atoms.

Preferred as the substituted amino group represented by $X^1$, $X^2$, or $X^3$ group represented by the following formula (5'-X):

(5'-X)

wherein $R^{95}$ and $R^{96}$ are each a hydrocarbyl group or a trihydrocarbylsilyl group, or $R^{95}$ is bonded to $R^{96}$ and the group in which $R^{95}$ is bonded to $R^{96}$ represents a hydrocarbylene group optionally having a nitrogen atom and/or an oxygen atom, or $R^{95}$ and $R^{96}$ represent together a group that is bonded to the nitrogen atom via a double bond.

Examples of the hydrocarbyl group represented by $R^{95}$ or $R^{96}$ include an alkyl group, an alkenyl group, an alkynyl group, an aryl group, and an aralkyl group. Examples of the alkyl group include a methyl group, an ethyl group, a n-propyl group, an isopropyl group, a n-butyl group, a sec-butyl group, and a tert-butyl group. Examples of the alkenyl group include a vinyl group, an allyl group, a 1-propenyl group, and an isopropenyl group. Examples of the alkynyl group include an ethynyl group and a 2-propynyl group. Examples of the aryl group include a phenyl group, a tolyl group, and a xylyl group. Examples of the aralkyl group include a benzyl group.

The number of the carbon atoms of the hydrocarbyl group represented by $R^{95}$ or $R^{96}$ is preferably 1 to 10, more preferably 1 to 4, and even more preferably 1 to 2.

Preferred as the hydrocarbyl group represented by $R^{95}$ or $R^{96}$ is an alkyl group, and more preferred is a linear alkyl group.

Examples of the trihydrocarbylsilyl group represented by $R^{95}$ or $R^{96}$ include trialkylsilyl groups such as a trimethylsilyl group, a triethylsilyl group, a triisopropylsilyl group, and a tert-butyl-dimethylsilyl group.

The trihydrocarbylsilyl group represented by $R^{95}$ or $R^{96}$ is preferably a trialkylsilyl group having 3 to 9 carbon atoms, more preferably a trialkylsilyl group in which the alkyl group bonded to the silicon atom is an alkyl group having 1 to 3 carbon atoms, and even more preferably a trimethylsilyl group.

In the group in which $R^{95}$ is bonded to $R^{96}$, examples of the hydrocarbylene group optionally having a nitrogen atom and/or an oxygen atom include a hydrocarbylene group, a hydrocarbylene group having a nitrogen atom, and a hydrocarbylene group having an oxygen atom. Examples of the hydrocarbylene group include alkylene groups such as an ethylene group, a trimethylene group, a tetramethylene group, a pentamethylene group, and a hexamethylene group. Examples of the hydrocarbylene group having a nitrogen atom include a group represented by —$CH_2CH_2$—NH—$CH_2$—, a group represented by —$CH_2CH_2$—N=CH—, a group represented by —CH=CH—N=CH—, and a group represented by —$CH_2CH_2$—NH—$CH_2CH_2$—. Examples of the hydrocarbylene group having an oxygen atom include a group represented by —$CH_2$—$CH_2$—O—$CH_2$—$CH_2$—.

The number of the carbon atoms of the group in which $R^{95}$ is bonded to $R^{96}$ is preferably 2 to 20, more preferably 2 to 7, and even more preferably 4 to 6.

In the group in which $R^{95}$ is bonded to $R^{96}$, the hydrocarbylene group optionally having a nitrogen atom and/or an oxygen atom is preferably a hydrocarbylene group, more preferably an alkylene group, and even more preferably a polymethylene group.

Examples of the group that is represented by $R^{95}$ and $R^{96}$ together and is bonded to the nitrogen atom via a double bond include hydrocarbylidene groups such as an ethylidene group, a propylidene group, a butylidene group, a 1-methylethylidene group, a 1-methylpropylidene group, and a 1,3-dimethylbutylidene group.

The number of the carbon atoms of the group that is represented by $R^{95}$ and $R^{96}$ together and is bonded to the nitrogen atom via a double bond is preferably 2 to 20, more preferably 2 to 6.

Preferably, $R^{95}$ and $R^{96}$ are each an alkyl group or a trialkylsilyl group, or $R^{95}$ is bonded to $R^{96}$ and the group in which $R^{95}$ is bonded to $R^{96}$ is an alkylene group, and more preferably, $R^{95}$ and $R^{96}$ are each an alkyl group.

Examples of the group represented by formula (5'-X) include an acyclic amino group and a cyclic amino group.

Among acyclic amino groups, examples of the group of formula (5'-X) in which $R^{95}$ and $R^{96}$ are each a hydrocarbyl group include dialkylamino groups such as a dimethylamino group, a diethylamino group, a di(n-propyl)amino group, a di(isopropyl)amino group, a di(n-butyl)amino group, a di(sec-butyl)amino group, a di(tert-butyl)amino group, and an ethylmethylamino group. Among acyclic amino groups, examples of the group of formula (5'-X) in which $R^{95}$ and $R^{96}$ are each a trihydrocarbylsilyl group include bis(trialkylsilyl)amino groups such as a bis(trimethylsilyl)amino group and a bis(tert-butyl-dimethylsilyl)amino group.

Among acyclic amino groups, examples of the group of formula (5'-X) in which $R^{95}$ and $R^{96}$ represent together a group that is bonded to the nitrogen atom via a double bond include an ethylideneamino group, a 1-methylpropylideneamino group, a 1,3-dimethylbutylideneamino group, a 1-methylethylideneamino group, and a 4-N,N-dimethylaminobenzylideneamino group.

Among such cyclic amino groups, examples of a group of formula (5'-X) in which $R^{95}$ is bonded to $R^{96}$ and the group in which $R^{95}$ is bonded to $R^{96}$ is a hydrocarbylene group include a 1-aziridinyl group, a 1-azetidinyl group, a 1-pyrrolidinyl group, a 1-piperidinyl group, a 1-hexamethyleneimino group, and a 1-pyrrolyl group. Among cyclic amino groups, examples of a group of formula (5'-X) in which $R^{95}$ is bonded to $R^{96}$ and the group in which $R^{95}$ is bonded to $R^{96}$ is a hydrocarbylene group having a nitrogen atom include a 1-imidazolyl group, a 4,5-dihydro-1-imidazolyl group, a 1-imidazolidinyl group, and a 1-piperazinyl group. Among cyclic amino groups, examples of a group of formula (5'-X) in which $R^{95}$ is bonded to $R^{96}$ and the group in which $R^{95}$ is bonded to $R^{96}$ is a hydrocarbylene group having an oxygen atom include a morpholino group.

The substituted amino group represented by $X^1$, $X^2$, or $X^3$ is preferably an acyclic amino group, and is more preferably a dialkylamino group. More preferred is a dimethylamino group, a diethylamino group, a di(n-propyl)amino group, or a di(n-butyl)amino group, and particularly preferred is a dimethylamino group or a diethylamino group.

In formula (5'-S), at least one of $X^1$, $X^2$, and $X^3$ is a substituted amino group, and preferably, two or more of $X^1$, $X^2$, and $X^3$ are substituted amino groups, and more preferably, two of $X^1$, $X^2$, and $X^3$ are substituted amino groups.

The compound represented by formula (5') is preferably a compound represented by the following formula (5'-1) wherein $R^9$ is a group represented by formula (5'-V1) and $A^9$ is a group represented by formula (5'-S):

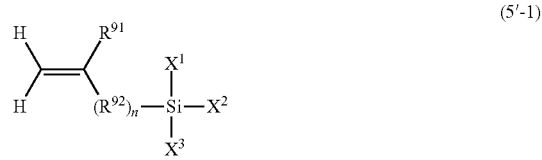

(5'-1)

wherein $R^{91}$ represents a hydrogen atom or a hydrocarbyl group, n represents an integer of 0 or 1, $R^{92}$ represents a hydrocarbylene group, and $X^1$, $X^2$, and $X^3$ each represent a substituted amino group or a hydrocarbyl group optionally having a substituent, provided that at least one of $X^1$, $X^2$, and $X^3$ is a substituted amino group.

Of the compounds represented by formula (5'-1), examples of the compound wherein $R^{91}$ is a hydrogen atom and one of $X^1$, $X^2$, and $X^3$ is a dialkylamino group include the following compounds.

Compounds of formula (5'-1) wherein n is 0:
(dimethylamino)dimethylvinylsilane,
(diethylamino)dimethylvinylsilane,
(dipropylamino)dimethylvinylsilane,
(dibutylamino)dimethylvinylsilane,
(dimethylamino)diethylvinylsilane,
(diethylamino)diethylvinylsilane,
(dipropylamino)diethylvinylsilane, and
(dibutylamino)diethylvinylsilane Compounds of formula (5'-1) wherein n is 1:
(dimethylamino)dimethyl(4-vinylphenyl)silane,
(dimethylamino)dimethyl(3-vinylphenyl)silane,
(diethylamino)dimethyl(4-vinylphenyl)silane,
(diethylamino)dimethyl(3-vinylphenyl)silane,
(dipropylamino)dimethyl(4-vinylphenyl)silane,
(dipropylamino)dimethyl(3-vinylphenyl)silane,
(dibutylamino)dimethyl(4-vinylphenyl)silane,
(dibutylamino)dimethyl(3-vinylphenyl)silane,
(dimethylamino)diethyl(4-vinylphenyl)silane,
(dimethylamino)diethyl(3-vinylphenyl)silane,
(diethylamino)diethyl(4-vinylphenyl)silane,
(diethylamino)diethyl(3-vinylphenyl)silane,
(dipropylamino)diethyl(4-vinylphenyl)silane,
(dipropylamino)diethyl(3-vinylphenyl)silane,
(dibutylamino)diethyl(4-vinylphenyl)silane, and
(dibutylamino)diethyl(3-vinylphenyl)silane.

Of the compounds represented by formula (5'-1), examples of the compound wherein $R^{91}$ is a hydrogen atom and two of $X^1$, $X^2$, and $X^3$ are dialkylamino groups include the following compounds.

Compounds of formula (5'-1) wherein n is 0:
bis(dimethylamino)methylvinylsilane,
bis(diethylamino)methylvinylsilane,
bis(dipropylamino)methylvinylsilane,
bis(dibutylamino)methylvinylsilane,
bis(dimethylamino)ethylvinylsilane,
bis(diethylamino)ethylvinylsilane,
bis(dipropylamino)ethylvinylsilane, and
bis(dibutylamino)ethylvinylsilane.

Compounds of formula (5'-1) wherein n is 1:
bis(dimethylamino)methyl(4-vinylphenyl)silane,
bis(dimethylamino)methyl(3-vinylphenyl)silane,
bis(diethylamino)methyl(4-vinylphenyl)silane,
bis(diethylamino)methyl(3-vinylphenyl)silane,
bis(dipropylamino)methyl(4-vinylphenyl)silane,
bis(dipropylamino)methyl(3-vinylphenyl)silane,
bis(dibutylamino)methyl(4-vinylphenyl)silane,
bis(dibutylamino)methyl(3-vinylphenyl)silane,
bis(dimethylamino)ethyl(4-vinylphenyl)silane,
bis(dimethylamino)ethyl(3-vinylphenyl)silane,
bis(diethylamino)ethyl(4-vinylphenyl)silane,
bis(diethylamino)ethyl(3-vinylphenyl)silane,
bis(dipropylamino)ethyl(4-vinylphenyl)silane,
bis(dipropylamino)ethyl(3-vinylphenyl)silane,
bis(dibutylamino)ethyl(4-vinylphenyl)silane, and
bis(dibutylamino)ethyl(3-vinylphenyl)silane.

Of the compounds represented by formula (5'-1), examples of the compound wherein $R^{91}$ is a methyl group and two of $X^1$, $X^2$, and $X^3$ are dialkylamino groups include the following compounds.

Compounds of formula (5'-1) wherein n is 1:
bis(dimethylamino)methyl(4-isopropenylphenyl)silane,
bis(dimethylamino)methyl(3-isopropenylphenyl)silane,
bis(diethylamino)methyl(4-isopropenylphenyl)silane,
bis(diethylamino)methyl(3-isopropenylphenyl)silane,
bis(dipropylamino)methyl(4-isopropenylphenyl)silane,
bis(dipropylamino)methyl(3-isopropenylphenyl)silane,
bis(dibutylamino)methyl(4-isopropenylphenyl)silane,
bis(dibutylamino)methyl(3-isopropenylphenyl)silane,
bis(dimethylamino)ethyl(4-isopropenylphenyl)silane,
bis(dimethylamino)ethyl(3-isopropenylphenyl)silane,
bis(diethylamino)ethyl(4-isopropenylphenyl)silane,
bis(diethylamino)ethyl(3-isopropenylphenyl)silane,
bis(dipropylamino)ethyl(4-isopropenylphenyl)silane,
bis(dipropylamino)ethyl(3-isopropenylphenyl)silane,
bis(dibutylamino)ethyl(4-isopropenylphenyl)silane, and
bis(dibutylamino)ethyl(3-isopropenylphenyl)silane.

Of the compounds represented by formula (5'-1), examples of the compound wherein $R^{91}$ is a vinyl group and two of $X^1$, $X^2$, and $X^3$ are dialkylamino groups include the following compounds.

Compounds of formula (5'-1) wherein n is 0:
bis(dimethylamino)methyl(1-methylene-2-propenyl)silane,
bis(diethylamino)methyl(1-methylene-2-propenyl)silane,
bis(dipropylamino)methyl(1-methylene-2-propenyl)silane,
bis(dibutylamino)methyl(1-methylene-2-propenyl)silane,
bis(dimethylamino)ethyl(1-methylene-2-propenyl)silane,
bis(diethylamino)ethyl(1-methylene-2-propenyl)silane,
bis(dipropylamino)ethyl(1-methylene-2-propenyl)silane, and
bis(dibutylamino)ethyl(1-methylene-2-propenyl)silane.

Of the compounds represented by formula (5'-1), examples of the compound wherein $R^{91}$ is a phenyl group and two of $X^1$, $X^2$, and $X^3$ are dialkylamino groups include the following compounds.

Compounds of formula (5'-1) wherein n is 1:
1-{4-[bis(dimethylamino)methylsilyl]phenyl}-1-phenylethylene,
1-{4-[bis(diethylamino)methylsilyl]phenyl}-1-phenylethylene
1-{4-[bis(dipropylamino)methylsilyl]phenyl}-1-phenylethylene,
1-{4-[bis(dibutylamino)methylsilyl]phenyl}-1-phenylethylene,
1-{4-[bis(dimethylamino)ethylsilyl]phenyl}-1-phenylethylene,
1-{4-[bis(diethylamino)ethylsilyl]phenyl}-1-phenylethylene,
1-{4-[bis(dipropylamino)ethylsilyl]phenyl}-1-phenylethylene, and
1-{4-[bis(dibutylamino)ethylsilyl]phenyl}-1-phenylethylene.

Of the compounds represented by formula (5'-1), examples of the compound wherein $R^{91}$ is a hydrogen atom and three of $X^1$, $X^2$, and $X^3$ are dialkylamino groups include the following compounds.

Compounds of formula (5'-1) wherein n is 0:
tris(dimethylamino)vinylsilane,
tris(diethylamino)vinylsilane,
tris(dipropylamino)vinylsilane, and
tris(dibutylamino)vinylsilane, Compounds of formula (5'-1) wherein n is 1:
tris(dimethylamino)(4-vinylphenyl)silane,
tris(dimethylamino)(3-vinylphenyl)silane,
tris(diethylamino)(4-vinylphenyl)silane,
tris(diethylamino)(3-vinylphenyl)silane,
tris(dipropylamino)(4-vinylphenyl)silane, tris(dipropylamino)(3-vinylphenyl)silane,
tris(dibutylamino)(4-vinylphenyl)silane, and
tris(dibutylamino)(3-vinylphenyl)silane.

Of the compounds represented by formula (5'-1), examples of the compound wherein $R^{91}$ is a methyl group and three of $X^1$, $X^2$, and $X^3$ are dialkylamino groups include the following compounds.

Compounds of formula (5'-1) wherein n is 1:
tris(dimethylamino)(4-isopropenylphenyl)silane,
tris(dimethylamino)(3-isopropenylphenyl)silane,
tris(diethylamino)(4-isopropenylphenyl)silane,
tris(diethylamino)(3-isopropenylphenyl)silane,
tris(dipropylamino)(4-isopropenylphenyl)silane,
tris(dipropylamino)(3-isopropenylphenyl)silane,
tris(dibutylamino)(4-isopropenylphenyl)silane, and
tris(dibutylamino)(3-isopropenylphenyl)silane.

Of the compounds represented by formula (5'-1), examples of the compound wherein $R^{91}$ is a vinyl group and three of $X^1$, $X^2$, and $X^3$ are dialkylamino groups include the following compounds.

Compounds of formula (5'-1) wherein n is 0:
tris(dimethylamino)(1-methylene-2-propenyl)silane,
tris(diethylamino)(1-methylene-2-propenyl)silane,
tris(dipropylamino)(1-methylene-2-propenyl)silane, and
tris(dibutylamino)(1-methylene-2-propenyl)silane.

Of the compounds represented by formula (5'-1), examples of the compound wherein $R^{91}$ is a phenyl group and three of $X^1$, $X^2$, and $X^3$ are dialkylamino groups include the following compounds.

Compounds of formula (5'-1) wherein n is 1:
1-[4-tris(dimethylamino)silylphenyl]-1-phenylethylene,
1-[4-tris(diethylamino)silylphenyl]-1-phenylethylene,
1-[4-tris(di-n-propylamino)methylsilylphenyl]-1-phenylethylene, and
1-[4-tris(di-n-butylamino)methylsilylphenyl]-1-phenylethylene.

Preferred as the compound represented by formula (5') is a compound represented by formula (5'-1), more preferred is a compound represented by formula (5'-1) wherein two of $X^1$, $X^2$, and $X^3$ in formula (5'-1) are dialkylamino groups, and even more preferred is a compound represented by formula (5'-1) wherein two of $X^1$, $X^2$, and $X^3$ in formula (5'-1) are dialkylamino groups, $R^{91}$ is a hydrogen atom, and n=0.

Particularly preferred as the compound represented by formula (5') is a compound represented by formula (5'-1) wherein two of $X^1$, $X^2$, and $X^3$ in formula (5'-1) are dialkylamino groups, the remaining one is an alkyl group or an alkoxyalkyl group, $R^{91}$ is a hydrogen atom, and n=0.

Most preferred as the compound represented by formula (5')
are bis(dimethylamino)methylvinylsilane,
bis(diethylamino)methylvinylsilane,
bis(dipropylamino)methylvinylsilane,
bis(dibutylamino)methylvinylsilane,
bis(dimethylamino)ethylvinylsilane,
bis(diethylamino)ethylvinylsilane,
bis(dipropylamino)ethylvinylsilane, and
bis(dibutylamino)ethylvinylsilane.

In the case where a compound containing a nitrogen atom and a hydrocarbyl group having a polymerizable carbon-carbon double bond is copolymerized with an aromatic vinyl compound and a conjugated diene compound, the added amount of the compound containing a nitrogen atom and a hydrocarbyl group having a polymerizable carbon-carbon double bond is preferably 0.01 mol to 1.00 mol, and more preferably 0.02 mol to 0.99 mol, per 1 mol of the alkali metal derived from the alkali metal-based polymerization initiator in terms of the enhancement of the fuel economy of tires produced from the composition containing the conjugated diene-based polymer.

(2) Method for Producing Modified Conjugated Diene-Based Polymer

In the method for producing a modified conjugated diene-based polymer of the present invention, a compound containing a nitrogen atom and/or a silicon atom is reacted on an active end of the conjugated diene-based polymer obtained by the method for producing a conjugated diene-based polymer of the present invention.

In the case of reacting the compound containing a nitrogen atom and/or a silicon atom, the added amount of the compound containing a nitrogen atom and/or a silicon atom is preferably 0.01 mol to 1.00 mol, and more preferably 0.02 mol to 0.99 mol, per 1 mol of the alkali metal derived from the alkali metal-based polymerization initiator in terms of the enhancement of the fuel economy of tires produced from the composition containing the conjugated diene-based polymer.

Examples of compounds preferable as the compound having a group containing a silicon atom include a compound containing a silicon atom and an epoxy group and a compound containing a silicon atom and a carbonyl group.

Examples of the compound having a group containing a silicon atom include
2-(3,4-epoxycyclohexyl)ethyltrimethoxysilane,
3-glycidoxypropylmethyldimethoxysilane,
3-glycidoxypropyltrimethoxysilane,
3-glycidoxypropylmethyldiethoxysilane,
3-glycidoxypropyltriethoxysilane,
3-methacryloxypropylmethyldimethoxysilane,
3-methacryloxypropyltrimethoxysilane,
3-methacryloxypropylmethyldiethoxysilane,
3-methacryloxypropyltriethoxysilane and
3-acryloxypropyltrimethoxysilane.

Examples of compounds preferable as the compound having a group containing a nitrogen atom include a compound containing a nitrogen atom and a carbonyl group and a compound containing a nitrogen atom and a silicon atom.

Preferred as the compound containing a nitrogen atom and a carbonyl group is a compound represented by the following formula (6):

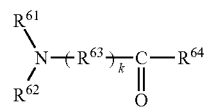

(6)

wherein $R^{61}$ and $R^{62}$ may be bonded to each other or $R^{61}$ and $R^{64}$ may be bonded to each other; $R^{61}$ represents a hydrocarbyl group optionally having a substituent, or is bonded to $R^{62}$ to represent a hydrocarbylene group optionally having a nitrogen atom and/or an oxygen atom, or is bonded to $R^{64}$ to represent a divalent group; $R^{62}$ represents a hydrocarbyl group optionally having a substituent, or is bonded to $R^{61}$ to represent a hydrocarbylene group optionally having a nitrogen atom and/or an oxygen atom; $R^{64}$ represents a hydrocarbyl group optionally having a substituent or a hydrogen atom, or is bonded to $R^{61}$ to represent a divalent group; $R^{63}$ represents a divalent group; and k represents 0 or 1.

In formula (6), the hydrocarbyl group optionally having a substituent and is represented by $R^{61}$, $R^{62}$, or $R^{64}$ is a hydrocarbyl group or a substituted hydrocarbyl group. Examples of the substituted hydrocarbyl group include a substituted hydrocarbyl group in which the substituent is a hydrocarbyloxy group, and a substituted hydrocarbyl group in which the substituent is a substituted amino group. Examples of the hydrocarbyl group include alkyl groups such as a methyl group, an ethyl group, a n-propyl group, an isopropyl group, and a n-butyl group; alkenyl groups such as a vinyl group, an allyl group, and an isopropenyl group; and aryl groups such as a phenyl group. Examples of the substituted hydrocarbyl group whose substituent is a hydrocarbyloxy group include alkoxyalkyl groups such as a methoxymethyl group, an ethoxymethyl group, and an ethoxyethyl group. Examples of the substituted hydrocarbyl group in which the substituent is a substituted amino group include (N,N-dialkylamino)alkyl groups such as a 2-(N,N-dimethylamino)ethyl group, a 2-(N,N-diethylamino)ethyl group, a 3-(N,N-dimethylamino)propyl group, and a 3-(N,N-diethylamino)propyl group; (N,N-dialkylamino) aryl groups such as a 4-(N,N-dimethylamino)phenyl group, a 3-(N,N-dimethylamino)phenyl group, a 4-(N,N-diethylamino)phenyl group, and a 3-(N,N-diethylamino)phenyl group; (N,N-dialkylamino)alkylaryl groups such as a 4-(N,N-dimethylamino)methylphenyl group and a 4-[2-(N,N-dimethylamino)ethyl]phenyl group; cyclic amino group-containing alkyl groups such as a 3-(1-pyrrolidinyl)propyl group, a 3-(1-piperidinyl)propyl group, and a 3-(1-imidazolyl)propyl group; cyclic amino group-containing aryl groups such as a 4-(1-pyrrolidinyl)phenyl group, a 4-(1-piperidinyl)phenyl group, and a 4-(1-imidazolyl)phenyl group; and cyclic amino group-containing alkylaryl groups such as a 4-[2-(1-pyrrolidinyl)ethyl]phenyl group, a 4-[2-(1-piperidinyl)ethyl]phenyl group, and a 4-[2-(1-imidazolyl)ethyl]phenyl group.

In formula (6), the hydrocarbylene group in which $R^{61}$ is bonded to $R^{62}$ optionally having a nitrogen atom and/or an oxygen atom is a hydrocarbylene group, or a heteroatom-containing hydrocarbylene group whose heteroatom is a nitrogen atom and/or an oxygen atom. Examples of the heteroatom-containing hydrocarbylene group whose heteroatom is a nitrogen atom and/or an oxygen atom include a heteroatom-containing hydrocarbylene group whose heteroatom is a nitrogen atom, and a heteroatom-containing hydrocarbylene group whose heteroatom is an oxygen atom. Examples of the hydrocarbylene group include alkylene groups such as a trimethylene group, a tetramethylene group, a pentamethylene group, a hexamethylene group, and a 2,2,4-trimethylhexane-1,6-diyl group; and arylene groups such as a 1,4-phenylene group. Examples of the heteroatom-containing hydrocarbylene group in which the heteroatom is a nitrogen atom include a group represented by —CH=N—CH=CH— and a group represented by —CH=N—CH$_2$—CH$_2$—. Examples of the heteroatom-containing hydrocarbylene group whose heteroatom is an oxygen atom include a group represented by —(CH$_2$)$_s$—O—(CH$_2$)$_t$— (s and t each represent an integer of 1 or more).

In formula (6), examples of the divalent group in which $R^{61}$ and $R^{64}$ are bonded to each other and a divalent group of $R^{63}$ include a hydrocarbylene group, a heteroatom-containing hydrocarbylene group whose heteroatom is a nitrogen atom, a heteroatom-containing hydrocarbylene group whose heteroatom is an oxygen atom, a group in which a hydrocarbylene group and an oxygen atom are bonded to each other, and a group in which a hydrocarbylene group and a group represented by —NR$^{65}$— (R$^{65}$ represents a hydrocarbyl group or a hydrogen atom) are bonded to each other. Examples of the hydrocarbylene group include alkylene groups such as a trimethylene group, a tetramethylene group, a pentamethylene group, a hexamethylene group, and a 2,2,4-trimethylhexane-1,6-diyl group; and arylene groups such as a 1,4-phenylene group. Examples of the heteroatom-containing hydrocarbylene group in which the heteroatom is a nitrogen atom include a group represented by —CH=N—CH=CH— and a group represented by —CH=N—CH$_2$—CH$_2$—. Examples of the heteroatom-containing hydrocarbylene group whose heteroatom is an oxygen atom include a group represented by —(CH$_2$)$_s$—O—(CH$_2$)$_t$— (s and t each represent an integer of 1 or more). Examples of the group in which a hydrocarbylene group and an oxygen atom are bonded to each other include a group represented by —(CH$_2$)$_u$—O— (u represents an integer of 1 or more). Examples of the group in which a hydrocarbylene group is bonded to a group represented by —NR$^{65}$— (R$^{65}$ represents a hydrocarbyl group or a hydrogen atom) include a group represented by —(CH$_2$)$_v$—NR$^{65}$— (R$^{65}$ represents a hydrocarbyl group having 1 to 6 carbon atoms or a hydrogen atom, and v represents an integer of 1 or more).

Examples of a preferred compound represented by formula (6) include a compound represented by formula (6-1) in which k is 0, and $R^{64}$ is a hydrogen atom or a hydrocarbyl group optionally having a substituent:

(6-1)

wherein $R^{61}$ and $R^{62}$ may be bonded to each other; $R^{61}$ represents a hydrocarbyl group optionally having a substituent or is bonded to $R^{62}$ to represent a hydrocarbylene group optionally having a nitrogen atom and/or an oxygen atom; $R^{62}$ represents a hydrocarbyl group optionally having a substituent or is bonded to $R^{61}$ to represent a hydrocarbylene group optionally having a nitrogen atom and/or an oxygen atom; and $R^{64}$ represents a hydrogen atom or a hydrocarbyl group optionally having a substituent.

In formula (6-1), explanation and examples of the hydrocarbyl group represented by $R^{61}$, $R^{62}$, or $R^{64}$ and optionally, having a substituent and the hydrocarbylene group in which $R^{61}$ is bonded to $R^{62}$ optionally having a nitrogen atom and/or an oxygen atom are the same as those described in the explanation of formula (6).

In formula (6-1), $R^{61}$ is preferably a hydrocarbyl group having 1 to 10 carbon atoms, or is bonded to $R^{62}$ to form a hydrocarbylene group having 3 to 10 carbon atoms or a heteroatom-containing hydrocarbylene group having 3 to 10 carbon atoms whose heteroatom is a nitrogen atom. More preferably, $R^{61}$ is an alkyl group having 1 to 10 carbon atoms or an aryl group having 6 to 10 carbon atoms, or is bonded to $R^{62}$ to form an alkylene group having 3 to 10 carbon atoms, a group represented by —CH=N—CH=CH—, or a group represented by —CH=N—CH$_2$—CH$_2$—. Even more preferably, $R^{61}$ is an alkyl group having 1 to 6 carbon atoms, and particularly preferably a methyl group or an ethyl group.

In formula (6-1), $R^{62}$ is preferably a hydrocarbyl group having 1 to 10 carbon atoms, or is bonded to $R^{61}$ to form a hydrocarbylene group having 3 to 10 carbon atoms or a heteroatom-containing hydrocarbylene group having 3 to 10 carbon atoms whose heteroatom is a nitrogen atom. More preferably, $R^{62}$ is an alkyl group having 1 to 10 carbon atoms or an aryl group having 6 to 10 carbon atoms, or is bonded to $R^{61}$ to form an alkylene group having 3 to 10 carbon atoms, a group represented by —CH=N—CH=CH—, or a group represented by —CH=N—CH$_2$—CH$_2$—. Even more preferably, $R^{62}$ an alkyl group having 1 to 6 carbon atoms, and particularly preferably a methyl group or an ethyl group.

In formula (6-1), $R^{64}$ is preferably a hydrocarbyl group or a hydrogen atom, more preferably a hydrocarbyl group having 1 to 10 carbon atoms or a hydrogen atom, even more preferably an alkyl group having 1 to 6 carbon atoms or a hydrogen atom, and particularly preferably a hydrogen atom, a methyl group, or an ethyl group.

Among the compounds represented by formula (6-1), examples of the compound wherein $R^{64}$ is a hydrocarbyl group include N,N-dihydrocarbylacetamides such as N,N-dimethylacetamide, N,N-diethylacetamide, and N-methyl-N-ethylacetamide; N,N-dihydrocarbylacrylamides such as N-dimethylacrylamide, N,N-diethylacrylamide, and N-methyl-N-ethylacrylamide; and N,N-dihydrocarbylmethacrylamides such as N,N-dimethylmethacrylamide, N,N-diethylmethacrylamide, and N-methyl-N-ethylmethacrylamide.

Among compounds represented by formula (6-1), examples of the compound wherein R" is a hydrogen atom include N,N-dihydrocarbylformamides such as N,N-dimethylformamide, N,N-diethylformamide, and N-methyl-N-ethylformamide.

Examples of a preferred compound represented by formula (6) include a compound represented by formula (6-2) in which k is 0, and $R^{64}$ is bonded to $R^{61}$ to form a divalent group:

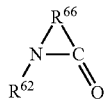

(6-2)

wherein $R^{62}$ represents a hydrocarbyl group optionally having a substituent, $R^{66}$ represents a group in which a hydrocarbylene group and a group represented by —$NR^{65}$— are bonded to each other, or a hydrocarbylene group, and $R^{65}$ represents a hydrocarbyl group or a hydrogen atom; the nitrogen atom to which $R^{65}$ is bonded is bonded to the carbon atom of C=O.

In formula (6-2), explanation and examples of the hydrocarbyl group optionally having a substituent represented by $R^{62}$ are the same as those of the group described in the explanation of formula (6).

In formula (6-2), examples of the hydrocarbylene group represented by $R^{66}$ include alkylene groups such as a trimethylene group, a tetramethylene group, a pentamethylene group, a hexamethylene group, and a 2,2,4-trimethylhexane-1,6-diyl group; and arylene groups such as a 1,4-phenylene group. Examples of the group represented by $R^{66}$ in which a hydrocarbylene group is bonded to a group represented by —$NR^{65}$— ($R^{65}$ represents a hydrocarbyl group or a hydrogen atom) include a group represented by —$(CH_2)_w$—$NR^{65}$— ($R^{65}$ represents a hydrocarbyl group or a hydrogen atom, and w represents an integer of 1 or more).

In formula (6-2), $R^{62}$ is preferably a hydrocarbyl group having 1 to 10 carbon atoms, more preferably an alkyl group having 1 to 10 carbon atoms or an aryl group having 6 to 10 carbon atoms, even more preferably an alkyl group having 1 to 6 carbon atoms or a phenyl group, and particularly preferably a methyl group, an ethyl group, or a phenyl group.

In formula (6-2), $R^{66}$ is preferably a hydrocarbylene group having 1 to 10 carbon atoms, or a group in which a hydrocarbylene group having 1 to 10 carbon atoms is bonded to a group represented by —$NR^{65}$— ($R^{65}$ represents a hydrocarbyl group having 1 to 10 carbon atoms or a hydrogen atom), more preferably an alkylene group having 3 to 6 carbon atoms or a group represented by —$(CH_2)_w$—$NR^{65}$— ($R^{65}$ represents a hydrocarbyl group having 1 to 10 carbon atoms, and w represents an integer of 2 to 5), and even more preferably a trimethylene group, a tetramethylene group, a pentamethylene group, or a group represented by —$(CH_2)_2$—$N(CH_3)$—.

Among the compounds represented by formula (6-2), examples of the compound wherein $R^{66}$ is a hydrocarbylene group include N-hydrocarbyl-β-propiolactams such as N-methyl-β-propiolactam and N-phenyl-β-propiolactam; N-hydrocarbyl-2-pyrrolidones such as N-methyl-2-pyrrolidone, N-vinyl-2-pyrrolidone, N-phenyl-2-pyrrolidone, N-tert-butyl-2-pyrrolidone, and N-methyl-5-methyl-2-pyrrolidone; N-hydrocarbyl-2-piperidones such as N-methyl-2-piperidone, N-vinyl-2-piperidone, and N-phenyl-2-piperidone; N-hydrocarbyl-ε-caprolactams such as N-methyl-ε-caprolactam and N-phenyl-ε-caprolactam; and N-hydrocarbyl-ω-laurylolactams such as N-methyl-ω-laurylolactam and N-vinyl-ω-laurylolactam. Preferred is a compound wherein $R^{66}$ is an alkylene group having 3 to 6 carbon atoms and $R^{62}$ is an alkyl group having 1 to 6 carbon atoms or a phenyl group, more preferred is a compound wherein $R^{66}$ is a trimethylene group, a tetramethylene group, or a pentamethylene group and $R^{62}$ is a methyl group, an ethyl group, or a phenyl group, and even more preferred are N-phenyl-2-pyrrolidone and N-methyl-ε-caprolactam.

Of the compounds represented by formula (6-2), examples of the compound wherein $R^{66}$ is a group in which a hydrocarbylene group and a group represented by —$NR^{65}$— ($R^{65}$ is a hydrocarbyl group or a hydrogen atom) are bonded to each other include 1,3-dihydrocarbyl-2-imidazolidinones such as 1,3-dimethyl-2-imidazolidinone, 1,3-diethyl-2-imidazolidinone, 1,3-divinyl-2-imidazolidinone, and 1-methyl-3-ethyl-2-imidazolidinone. Preferred is a compound wherein $R^{66}$ is a group represented by —$(CH_2)_w$—$NR^{65}$— ($R^{65}$ represents a hydrocarbyl group having 1 to 10 carbon atoms, and w represents an integer of 2 to 5), and $R^{62}$ is an alkyl group having 1 to 6 carbon atoms or a phenyl group, more preferred is a group in which $R^{66}$ is represented by —$(CH_2)_2$—$N(CH_3)$— and $R^{62}$ is a methyl group or an ethyl group, and even more preferred is 1,3-dimethyl-2-imidazolidinone.

Examples of a preferred compound represented by formula (6) include a compound represented by the following formula (6-3) wherein k is 1 and $R^{63}$ is a hydrocarbylene group:

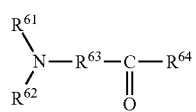

(6-3)

wherein $R^{61}$ represents a hydrocarbyl group optionally having a substituent or is bonded to $R^{62}$ to represent a hydrocarbylene group optionally having a nitrogen atom and/or an oxygen atom; $R^{62}$ represents a hydrocarbyl group optionally having a substituent or is bonded to $R^{61}$ to represent a hydrocarbylene group optionally having a nitrogen atom and/or an oxygen atom; $R^{63}$ represents a hydrocarbylene group, and $R^{64}$ represents a hydrocarbyl group optionally having a substituent.

In formula (6-3), explanation and examples of the hydrocarbyl group represented by $R^{61}$, $R^{62}$, or $R^{64}$ and optionally having a substituent, the hydrocarbylene group in which $R^{61}$ is bonded to $R^{62}$ optionally having a nitrogen atom and/or an oxygen atom, and the hydrocarbylene group of $R^{63}$ are the same as those described in the explanation of formula (6).

In formula (6-3), $R^{63}$ is preferably a hydrocarbylene group having 1 to 10 carbon atoms, more preferably an alkylene group having 1 to 10 carbon atoms or an arylene group having 6 to 10 carbon atoms, even more preferably an alkylene group having 1 to 6 carbon atoms or a phenylene group, and particularly preferably an ethylene group, a trimethylene group, or a 1,4-phenylene group.

In formula (6-3), $R^{64}$ is preferably a hydrocarbyl group having 1 to 10 carbon atoms, or a substituted hydrocarbyl group having 3 to 10 carbon atoms whose substituent is a dialkylamino group, more preferably an alkyl group having 1 to 6 carbon atoms, an aryl group having 6 to 10 carbon atoms, a dialkylaminoalkyl group having 3 to 6 carbon atoms, or a dialkylaminoaryl group having 8 to 10 carbon atoms, and even more preferably a methyl group, an ethyl group, a dialkylaminomethyl group having 3 to 6 carbon atoms, a dialkylaminoethyl group having 4 to 6 carbon atoms, a phenyl group, or a dialkylaminophenyl group having 8 to 10 carbon atoms.

In formula (6-3), $R^{61}$ is preferably a hydrocarbyl group having 1 to 10 carbon atoms or is bonded to $R^{62}$ to form a hydrocarbylene group having 3 to 10 carbon atoms or a heteroatom-containing hydrocarbylene group having 3 to 10 carbon atoms whose heteroatom is a nitrogen atom, more preferably an alkyl group having 1 to 10 carbon atoms or an aryl group having 6 to 10 carbon atoms or is bonded to $R^{62}$ to form an alkylene group having 3 to 10 carbon atoms, a group represented by —CH=N—CH=CH—, a group represented by —CH=N—CH$_2$—CH$_2$—, or a group represented by —(CH$_2$)$_2$—O—(CH$_2$)$_2$—, even more preferably an alkyl group having 1 to 6 carbon atoms or is bonded to $R^{62}$ to form an alkylene group having 3 to 6 carbon atoms, a group represented by —CH=N=CH=CH—, or a group represented by —CH=N—CH$_2$—CH$_2$—, and particularly preferably a methyl group or an ethyl group or is bonded to $R^{62}$ to form a tetramethylene group, a hexamethylene group, or a group represented by —CH=N—CH=CH—.

In formula (6-3), $R^{62}$ is preferably a hydrocarbyl group having 1 to 10 carbon atoms or is bonded to $R^{61}$ to form a hydrocarbylene group having 3 to 10 carbon atoms or a heteroatom-containing hydrocarbylene group having 3 to 10 carbon atoms whose heteroatom is a nitrogen atom, more preferably an alkyl group having 1 to 10 carbon atoms or an aryl group having 6 to 10 carbon atoms or is bonded to $R^{61}$ to form an alkylene group having 3 to 10 carbon atoms, a group represented by —CH=N—CH=CH—, a group represented by —CH=N—CH$_2$—CH$_2$—, or a group represented by —(CH$_2$)$_2$—O—(CH$_2$)$_2$—, even more preferably an alkyl group having 1 to 6 carbon atoms or is bonded to $R^{61}$ to form an alkylene group having 3 to 6 carbon atoms, a group represented by —CH=N=CH=CH—, or a group represented by —CH=N—CH$_2$—CH$_2$—, and particularly preferably a methyl group or an ethyl group or is bonded to $R^{61}$ to form a tetramethylene group, a hexamethylene group, or a group represented by —CH=N—CH=CH—.

Of the compounds represented by formula (6-3), examples of the compound wherein $R^{63}$ is an arylene group and $R^{64}$ is an alkyl group include 4-(N,N-dihydrocarbylamino)acetophenones such as 4-(N,N-dimethylamino)acetophenone, 4-(N-methyl-N-ethylamino)acetophenone, and 4-(N,N-diethylamino)acetophenone; and 4-cyclic aminoacetophenone compounds such as 4'-(imidazol-1-yl)acetophenone. Of these, 4-cyclic aminoacetophenone compounds are preferred, and 4'-(imidazol-1-yl)acetophenone is more preferred.

Of the compounds represented by formula (6-3), examples of the compound wherein $R^{63}$ is an arylene group and $R^{64}$ is an aryl group or a substituted aryl group include bis(dihydrocarbylaminoalkyl)ketones such as 1,7-bis(methylethylamino)-4-heptanone and 1,3-bis(diphenylamino)-2-propanone; 4-(dihydrocarbylamino)benzophenones such as 4-N,N-dimethylaminobenzophenone, 4-N,N-diethylaminobenzophenone, 4-N,N-di-tert-butylaminobenzophenone, and 4-N,N-diphenylaminobenzophenone; and 4,4'-bis(dihydrocarbylamino)benzophenones such as 4,4'-bis(dimethylamino)benzophenone, 4,4'-bis(diethylamino)benzophenone, and 4,4'-bis(diphenylamino)benzophenone. Of these, compounds in which $R^{61}$ and $R^{62}$ are alkyl groups having 1 to 6 carbon atoms, $R^{63}$ is a phenylene group, and $R^{64}$ is a phenyl group or a dialkylaminophenyl group having 8 to 10 carbon atoms are preferred, and 4-N,N-dimethylaminobenzophenone, 4-N,N-diethylaminobenzophenone, 4,4'-bis(dimethylamino)benzophenone, and 4,4'-bis(diethylamino)benzophenone are more preferred.

Examples of a preferred compound represented by formula (6) include a compound represented by the following formula (6-4) wherein k is 1, and $R^{63}$ is a group in which a hydrocarbylene group and an oxygen atom are bonded to each other or a group in which a hydrocarbylene group and a group represented by —NR$^{65}$— ($R^{65}$ represents a hydrocarbyl group or a hydrogen atom) are bonded to each other:

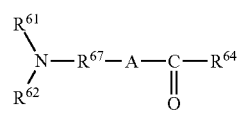

(6-4)

wherein $R^{61}$ represents a hydrocarbyl group optionally having a substituent or is bonded to $R^{62}$ to represent a hydrocarbylene group optionally having a nitrogen atom and/or an oxygen atom; $R^{62}$ represents a hydrocarbyl group optionally having a substituent or is bonded to $R^{61}$ to represent a hydrocarbylene group optionally having a nitrogen atom and/or an oxygen atom; $R^{67}$ represents a hydrocarbylene group; A represents an oxygen atom or —NR$^{65}$— wherein $R^{65}$ represents a hydrocarbylene group or a hydrogen atom; and $R^{64}$ represents a hydrocarbyl group optionally having a substituent.

In formula (6-4), explanation and examples of the hydrocarbyl group represented by $R^{61}$, $R^{62}$, or $R^{64}$ and optionally having a substituent and the hydrocarbylene group in which $R^{61}$ is bonded to $R^{62}$ optionally having a nitrogen atom and/or an oxygen atom are the same as those of the group described in the explanation of formula (6).

In formula (6-4), A is preferably an oxygen atom or a group represented by —NR$^{65}$— ($R^{65}$ is a hydrocarbylene group having 1 to 5 carbon atoms or a hydrogen atom), more preferably an oxygen atom or a group represented by —NH—, and even more preferably a group represented by —NH—.

In formula (6-4), examples of the hydrocarbylene group represented by $R^{67}$ include alkylene groups such as a trimethylene group, a tetramethylene group, a pentamethylene group, a hexamethylene group, and a 2,2,4-trimethylhexane-1,6-diyl group; and arylene groups such as a 1,4-phenylene group.

In formula (6-4), $R^{64}$ is preferably a hydrocarbyl group having 1 to 10 carbon atoms, more preferably an alkenyl group having 2 to 5 carbon atoms, even more preferably a vinyl group or an isopropenyl group, and particularly preferably a vinyl group.

In formula (6-4), $R^{67}$ is preferably a hydrocarbylene group having 1 to 10 carbon atoms, more preferably an alkylene group having 1 to 6 carbon atoms, even more preferably an ethylene group or a trimethylene group, and particularly preferably a trimethylene group.

In formula (6-4), $R^{61}$ is preferably a hydrocarbyl group having 1 to 10 carbon atoms or is bonded to $R^{62}$ to form a hydrocarbylene group having 3 to 10 carbon atoms or a heteroatom-containing hydrocarbylene group having 3 to 10 carbon atoms whose heteroatom is a nitrogen atom, more preferably an alkyl group having 1 to 10 carbon atoms or an aryl group having 6 to 10 carbon atoms or is bonded to $R^{62}$ to form an alkylene group having 3 to 10 carbon atoms, a group represented by —CH=N—CH=CH—, a group represented by —CH=N—CH$_2$—CH$_2$—, or a group represented by —(CH$_2$)$_2$—O—(CH$_2$)$_2$—, even more preferably an alkyl group having 1 to 6 carbon atoms or is bonded to $R^{62}$ to form an alkylene group having 3 to 6 carbon atoms, a group represented by —CH=N—CH=CH—, or a group represented by —CH=N—CH$_2$—CH$_2$—, and particularly preferably a methyl group or an ethyl group or is bonded to $R^{62}$ to form a tetramethylene group, a hexamethylene group, or a group represented by —CH=N—CH=CH—.

In formula (6-4), $R^{62}$ is preferably a hydrocarbyl group having 1 to 10 carbon atoms or is bonded to $R^{61}$ to form a hydrocarbylene group having 3 to 10 carbon atoms or a heteroatom-containing hydrocarbylene group having 3 to 10 carbon atoms whose heteroatom is a nitrogen atom, more preferably an alkyl group having 1 to 10 carbon atoms or an aryl group having 6 to 10 carbon atoms or is bonded to $R^{61}$ to form an alkylene group having 3 to 10 carbon atoms, a group represented by —CH=N—CH=CH—, a group represented by —CH=N—CH$_2$—CH$_2$—, or a group represented by —(CH$_2$)$_2$—O—(CH$_2$)$_2$—, even more preferably an alkyl group having 1 to 6 carbon atoms or is bonded to $R^{61}$ to form an alkylene group having 3 to 6 carbon atoms, a group represented by —CH=N—CH=CH—, or a group represented by —CH=N—CH$_2$—CH$_2$—, and particularly preferably a methyl group or an ethyl group or is bonded to $R^{61}$ to form a tetramethylene group, a hexamethylene group, or a group represented by —CH—N=CH=CH—.

Of the compounds represented by formula (6-4), examples of the compound wherein A is an oxygen atom include 2-(dihydrocarbylamino)ethyl acrylates such as 2-(dimethylamino)ethyl acrylate and 2-(diethylamino)ethyl acrylate; 3-(dihydrocarbylamino)propyl acrylates such as 3-(dimethylamino)propyl acrylate; 2-(dihydrocarbylamino)ethyl methacrylates such as 2-(dimethylamino)ethyl methacrylate and 2-(diethylamino)ethyl methacrylate; and 3-(dihydrocarbylamino)propyl methacrylates such as 3-(dimethylamino)propyl methacrylate. A compound wherein A is an oxygen atom, $R^{61}$ and $R^{62}$ are alkyl groups having 1 to 6 carbon atoms, $R^{64}$ is a vinyl group or an isopropenyl group, and $R^{67}$ is an ethylene group or a trimethylene group is preferred, and a compound wherein A is an oxygen atom, $R^{61}$ and $R^{62}$ are a methyl group or an ethyl group, $R^{64}$ is a vinyl group, and $R^{67}$ is a trimethylene group is more preferred.

Of the compounds represented by formula (6-4), examples of a compound wherein A is a group represented by —NR$^{65}$— ($R^{65}$ is a hydrocarbylene group or a hydrogen atom) include N-(2-dihydrocarbylaminoethyl)acrylamides such as N-(2-dimethylaminoethyl)acrylamide and N-(2-diethylaminoethyl)acrylamide; N-(3-dihydrocarbylaminopropyl)acrylamides such as N-(3-dimethylaminopropyl)acrylamide and N-(3-diethylaminopropyl)acrylamide; N-(4-dihydrocarbylaminobutyl)acrylamides such as N-(4-dimethylaminobutyl)acrylamide and N-(4-diethylaminobutyl)acrylamide; N-(2-dihydrocarbylaminoethyl)methacrylamides such as N-(2-dimethylaminoethyl)methacrylamide and N-(2-diethylaminoethyl)methacrylamide; N-(3-dihydrocarbylaminopropyl)methacrylamides such as N-(3-dimethylaminopropyl)methacrylamide and N-(3-diethylaminopropyl)methacrylamide; and N-(4-dihydrocarbylaminobutyl)methacrylamides such as N-(4-dimethylaminobutyl)methacrylamide and N-(4-diethylaminobutyl)methacrylamide. Of these, a compound wherein A is a group represented by —NH—, $R^{61}$ and $R^{62}$ are each an alkyl group having 1 to 6 carbon atoms, $R^{64}$ is a vinyl group or an isopropenyl group, and $R^{67}$ is an ethylene group or a trimethylene group is preferred, and a compound wherein A is a group represented by —NH—, $R^{61}$ and $R^{62}$ are each a methyl group or an ethyl group, $R^{64}$ is a vinyl group, and $R^{67}$ is a trimethylene group is more preferred.

Preferred as the compound containing a nitrogen atom and a silicon atom is a compound represented by the following formula (7):

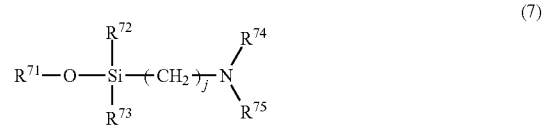

wherein $R^{71}$ represents a hydrocarbyl group, $R^{72}$ and $R^{73}$ each represent a hydrocarbyl group or a hydrocarbyloxy group, $R^{74}$ represents a hydrocarbyl group optionally having a substituent or a trihydrocarbylsilyl group or is bonded to $R^{75}$ to represent a hydrocarbylene group optionally having at least one kind of atom selected from the atom group consisting of a silicon atom, a nitrogen atom, and an oxygen atom, $R^{75}$ represents a hydrocarbyl group optionally having a substituent or a trihydrocarbylsilyl group or is bonded to $R^{74}$ to represent a hydrocarbylene group optionally having at least one kind of atom selected from the atom group consisting of a silicon atom, a nitrogen atom, and an oxygen atom, and j represents an integer of 1 to 5.

In the above formula (7) the hydrocarbyl group optionally having a substituent is a hydrocarbyl group or a substituted hydrocarbyl group.

In the above formula (7), examples of the hydrocarbyl group include alkyl groups such as a methyl group, an ethyl group, a n-propyl group, an isopropyl group, and a n-butyl group; alkenyl groups such as a vinyl group, an allyl group, and an isopropenyl group; and aryl groups such as a phenyl group; alkyl groups are preferred, and a methyl group or an ethyl group is more preferred. Examples of the substituted hydrocarbyl group include oxacycloalkyl groups such as an oxiranyl group and a tetrahydrofuranyl group, and preferred is a tetrahydrofuranyl group.

In the present specification, the oxacycloalkyl group represents a group in which CH$_2$ on the alicyclic ring of the cycloalkyl group has been substituted with an oxygen atom.

Examples of the hydrocarbyloxy group include alkoxy groups such as a methoxy group, an ethoxy group, a n-propoxy group, an isopropoxy group, a n-butoxy group, a sec-butoxy group, and a tert-butoxy group; and aryloxy groups such as a phenoxy group and a benzyloxy group; alkoxy groups are preferred, and a methoxy group or an ethoxy group is more preferred.

Examples of the trihydrocarbylsilyl group include a trimethylsilyl group and a tert-butyl-dimethylsilyl group, and a trimethylsilyl group is preferred.

The hydrocarbylene group optionally having at least one kind of atom selected from the atom group consisting of a silicon atom, a nitrogen atom, and an oxygen atom is a hydrocarbylene group or a heteroatom-containing hydrocarbylene group whose heteroatom is at least one kind of atom selected from the atom group consisting of a silicon atom, a nitrogen atom, and an oxygen atom. Examples of the heteroatom-containing hydrocarbylene group wherein the heteroatom is at least one kind of atom selected from the atom group consisting of a silicon atom, a nitrogen atom, and an oxygen atom include a heteroatom-containing hydrocarbylene group wherein the heteroatom is a silicon atom, a heteroatom-containing hydrocarbylene group wherein the heteroatom is a nitrogen atom, and a heteroatom-containing hydrocarbylene group wherein the heteroatom is an oxygen atom. Examples of the hydrocarbylene group include alkylene groups such as a tetramethylene group, a pentamethylene group, a hexamethylene group, and a 2,2,4-trimethylhexane-1,6-diyl group; among others, an alkylene group having 4 to 7 carbon atoms is preferred, and a pentamethylene group or a hexamethylene group is particularly preferred. Examples of the heteroatom-containing hydrocarbylene group wherein the heteroatom is a silicon atom include a group represented by —Si(CH$_3$)$_2$—CH$_2$—CH$_2$—Si(CH$_3$)$_2$—. Examples of the heteroatom-containing hydrocarbylene group whose heteroatom is a nitrogen atom include a group represented by —CH=N—CH=CH— and a group represented by —CH=N—CH$_2$—CH$_2$—. Examples of the heteroatom-containing hydrocarbylene group whose heteroatom is an oxygen atom include a group represented by —CH$_2$—CH$_2$—O—CH$_2$—CH$_2$—.

In the above formula (7), $R^{71}$ is preferably an alkyl group having 1 to 4 carbon atoms and more preferably a methyl group or an ethyl group. Preferably, $R^{72}$ and $R^{73}$ are each a hydrocarbyloxy group, more preferably an alkoxy group having 1 to 4 carbon atoms, and even more preferably a methoxy group or an ethoxy group. Preferably, $R^{74}$ and $R^{75}$ are each a hydrocarbyl group, more preferably an alkyl group having 1 to 4 carbon atoms, and even more preferably a methyl group or an ethyl group. j is preferably an integer of 2 to 4.

Examples of the compound represented by the above formula (7) include [(dialkylamino)alkyl]alkoxysilane compounds such as [3-(dimethylamino)propyl]triethoxysilane, [3-(dimethylamino)propyl]trimethoxysilane, [3-(diethylamino)propyl]triethoxysilane, [3-(diethylamino)propyl]trimethoxysilane, [3-(dimethylamino)propyl]methyldiethoxysilane, [2-(dimethylamino)ethyl]triethoxysilane, and [2-(dimethylamino)ethyl]trimethoxysilane; cyclic aminoalkylalkoxysilane compounds such as (1-hexamethyleneiminomethyl)trimethoxysilane, [3-(1-hexamethyleneimino)propyl]triethoxysilane, N-(3-triethoxysilylpropyl)-4,5-dihydroimidazole, and N-(3-trimethoxysilylpropyl)-4,5-imidazole; {[di(tetrahydrofuranyl)amino]alkyl}alkoxysilane compounds such as {3-[di(tetrahydrofuranyl)amino]propyl}trimethoxysilane and {3-[di(tetrahydrofuranyl)amino]propyl}triethoxysilane; and [N,N-bis(trialkylsilyl)aminoalkyl]alkylalkoxysilane compounds such as {3-[N,N-bis(trimethylsilyl)amino]propyl}methyldimethoxysilane and {3-[N,N-bis(trimethylsilyl)amino]propyl}methyldiethoxysilane. More preferred is a compound wherein $R^{71}$ is an alkyl group having 1 to 4 carbon atoms, $R^{72}$ and $R^{73}$ are each an alkoxy group having 1 to 4 carbon atoms, $R^{74}$ and $R^{75}$ are each an alkyl group having 1 to 4 carbon atoms, and j is an integer of 2 to 4, and even more preferred are [3-(dimethylamino)propyl]triethoxysilane, [3-(dimethylamino)propyl]trimethoxysilane, [3-(diethylamino)propyl]triethoxysilane, and [3-(diethylamino)propyl]trimethoxysilane.

Examples of the compound containing an alkoxysilyl group other than the above-described compound having a nitrogen atom and an alkoxysilyl group include tetraalkoxysilanes such as tetramethoxysilane, tetraethoxysilane, and tetra-n-propoxysilane; trialkoxyhydrocarbyisilanes such as methyltrimethoxysilane, methyltriethoxysilane; ethyltrimethoxysilane, and phenyltrimethoxysilane; trialkoxyhalosilanes such as trimethoxychlorosilane, triethoxychlorosilane, and tri-n-propoxychlorosilane; dialkoxydihydrocarbylsilanes such as dimethoxydimethylsilane, diethoxydimethylsilane, and dimethoxydiethylsilane; dialkoxydihalosilanes such as dimethoxydichlorosilane, diethoxydichlorosilane, and di-n-propoxydichlorosilane; monoalkoxytrihydrocarbylsilanes such as methoxytrimethylsilane; monoalkoxytrihalosilanes such as methoxytrichlorosilane and ethoxytrichlorosilane; (glycidoxyalkyl)alkylalkoxysilane compounds such as 2-glycidoxyethyltrimethoxysilane, 2-glycidoxyethyltriethoxysilane, (2-glycidoxyethyl)methyldimethoxysilane, 3-glycidoxypropyltrimethoxysilane, 3-glycidoxypropyltriethoxysilane, and (3-glycidoxypropyl)methyldimethoxysilane; (3,4-epoxycyclohexyl)alkylalkoxysilane compounds such as 2-(3,4-epoxycyclohexyl)ethyltrimethoxysilane and 2-(3,4-epoxycyclohexyl)ethyltriethoxysilane; [(3,4-epoxycyclohexyl)alkyl]alkylalkoxysilane compounds such as [2-(3,4-epoxycyclohexyl)ethyl]methyldimethoxysilane; alkoxysilylalkylsuccinic anhydrides such as 3-trimethoxysilylpropylsuccinic anhydride and 3-triethoxysilylpropylsuccinic anhydride; and (methacryloyloxyalkyl)alkoxysilane compounds such as 3-methacryloyloxypropyltrimethoxyl lane and 3-methacryloyloxypropyltriethoxysilane.

The compound containing an alkoxysilyl group may contain a nitrogen atom and a group represented by >C=O. Examples of a compound containing an alkoxysilyl group and also containing a nitrogen atom and a group represented by >C=O include tris[(alkoxysilyl)alkyl]isocyanurate compounds such as tris[3-(trimethoxysilyl)propyl]isocyanurate, tris[3-(triethoxysilyl)propyl]isocyanurate, tris[3-(tripropoxysilyl)propyl]isocyanurate, and tris[3-(tributoxysilyl)propyl]isocyanurate. Of these, tris[3-(trialkoxysilyl)propyl]isocyanurate is preferred, tris[3-(trialkoxysilyl)propyl]isocyanurate where in the alkoxy group is an alkoxy group having 1 to 4 carbon atoms is more preferred, and tris[3-(trimethoxysilyl)propyl]isocyanurate is even more preferred.

Examples of a compound preferable as the compound having a group containing a nitrogen atom include a compound represented by the following formula (8):

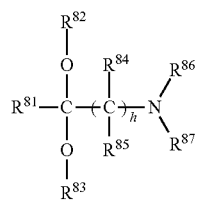

wherein $R^{81}$ represents a hydrogen atom, a hydrocarbyl group, or a hydrocarbyloxy group; $R^{82}$ and $R^{83}$ each represent a hydrocarbyl group; h represents an integer of 0 to 10; $R^{84}$ and $R^{85}$ each represent a hydrogen atom or a hydrocarbyl group, provided that when there are a plurality of $R^{84}$s, the $R^{84}$s may be either the same or different, and when there are a plurality of $R^{85}$s, the $R^{85}$s may be either the same or different; $R^{86}$ and $R^{87}$ each represent a hydrocarbyl group optionally having a substituent or a trihydrocarbylsilyl group, or alternatively $R^{86}$ and $R^{87}$ are bonded to each other and together represent a hydrocarbylene group optionally having at least one kind of atom selected from the atom group consisting of a silicon atom, a nitrogen atom, and an oxygen atom.

$R^{81}$ represents a hydrogen atom, a hydrocarbyl group, or a hydrocarbyloxy group. Preferred as the hydrocarbyl group is a hydrocarbyl group having 1 to 4 carbon atoms, more preferred is an alkyl group having 1 to 4 carbon atoms, and even more preferred are a methyl group and an ethyl group. Preferred as the hydrocarbyloxy group is a hydrocarbyloxy group having 1 to 4 carbon atoms, more preferred is an alkoxy group having 1 to 4 carbon atoms, and even more preferred are a methoxy group and an ethoxy group. Of these, preferred is a hydrogen atom.

$R^{82}$ and $R^{83}$ each represent a hydrocarbyl group. Preferred as the hydrocarbyl group is a hydrocarbyl group having 1 to 4 carbon atoms, more preferred is an alkyl group having 1 to 4 carbon atoms, and even more preferred are a methyl group and an ethyl group. $R^{82}$ and $R^{83}$ may be either the same group or different groups.

h represents an integer of 0 to 10. h is preferably 3 or less, and more preferably 0.

$R^{84}$ and $R^{85}$ each represent a hydrogen atom or a hydrocarbyl group, provided that when there are a plurality of $R^{84}$s, the $R^{84}$s may be either the same or different, and when there are a plurality of $R^{85}$s, the $R^{85}$s may be either the same or different. Preferred as the hydrocarbyl group is a hydrocarbyl group having 1 to 4 carbon atoms, more preferred is an alkyl group having 1 to 4 carbon atoms, and even more preferred are a methyl group and an ethyl group.

$R^{86}$ and $R^{87}$ each represent a hydrocarbyl group optionally having a substituent or a trihydrocarbylsilyl group. The hydrocarbyl group optionally having a substituent is a hydrocarbyl group or a substituted hydrocarbyl group. Preferred as the hydrocarbyl group is a hydrocarbyl group having 1 to 4 carbon atoms. Examples of the substituted hydrocarbyl group include a substituted hydrocarbyl group whose substituent is a substituted amino group such as an N,N-dimethylaminomethyl group, a 2-N,N-dimethylaminoethyl group, and a 3-N,N-dimethylaminopropyl group; and a substituted hydrocarbyl group whose substituent is a hydrocarbyloxy group such as a methoxymethyl group, a methoxyethyl group, and an ethoxymethyl group. Examples of the trihydrocarbylsilyl group include a trimethylsilyl group and a test-butyl-dimethylsilyl group, and a trimethylsilyl group is preferred. Of these, preferred is a hydrocarbyl group, more preferred is a hydrocarbyl group having 1 to 4 carbon atoms, even more preferred is an alkyl group having 1 to 4 carbon atoms, and particularly preferred are a methyl group and an ethyl group.

$R^{86}$ and $R^{87}$ may be bonded to each other and together represent a hydrocarbylene group optionally having at least one kind of atom selected from the atom group consisting of a silicon atom, a nitrogen atom, and an oxygen atom. Examples of the hydrocarbylene group include alkylene groups such as a tetramethylene group, a pentamethylene group, a hexamethylene group, and a 2,2,4-trimethylhexane-1,6-diyl group; and alkenediyl groups such as a pentan-2-ene-1,5-diyl group, an alkylene group is preferred, and an alkylene group having 4 to 7 carbon atoms is more preferred. Examples of the heteroatom-containing hydrocarbylene group wherein the heteroatom is a silicon atom include a group represented by —Si(CH$_3$)$_2$—CH$_2$—CH$_2$—Si(CH$_3$)$_2$—. Examples of the heteroatom-containing hydrocarbylene group wherein the heteroatom is a nitrogen atom include a group represented by —CH=N—CH=CH— and a group represented by —CH=N—CH$_2$—CH$_2$—. Examples of the heteroatom-containing hydrocarbylene group wherein the heteroatom is an oxygen atom include a group represented by —CH$_2$—CH$_2$—O—CH$_2$—CH$_2$—. Of these, preferred is a hydrocarbylene group, more preferred is an alkylene group having 4 to 7 carbon atoms, and even more preferred are a tetramethylene group, a pentamethylene group, and a hexamethylene group.

Examples of the compound represented by formula (8) include N,N-dialkylformamide dialkyl acetals such as N,N-dimethylformamide dimethyl acetal, N,N-diethylformamide dimethyl acetal, N,N-dimethylformamide diethyl acetal, and N,N-diethylformamide diethyl acetal; and N,N-dialkylacetamide dialkyl acetals such as N,N-dimethylacetamide dimethyl acetal, N,N-diethylacetamide dimethyl acetal, N,N-dimethylacetamide diethyl acetal, and N,N-diethylacetamide diethyl acetal.

Preferred as the compound represented by formula (8) are compounds wherein h is 3 or less, $R^{81}$ is a hydrogen atom, and $R^{82}$, $R^{83}$, $R^{84}$, $R^{85}$, $R^{86}$, and $R^{87}$ are each an alkyl group having 1 to 4 carbon atoms. More preferred are compounds wherein h is 0, $R^{81}$ is a hydrogen atom, and $R^{82}$, $R^{83}$, $R^{86}$, and $R^{87}$ are each an alkyl group having 1 to 4 carbon atoms. Particularly preferred are N,N-dimethylformamide dimethyl acetal, N,N-diethylformamide dimethyl acetal, N,N-dimethylformamide diethyl acetal, and N,N-diethylformamide diethyl acetal.

In the method for producing a conjugated diene-based polymer of the present invention and the method for producing a modified conjugated diene-based polymer of the present invention, a coupling agent may be added to a polymerization solution during a period of time from the beginning of the polymerization of monomers to the recovery of a polymer described later. Examples of such a coupling agent include a compound represented by the following formula (10):

$$R^{100}{}_a M^1 L_{4-a} \quad (10)$$

wherein $R^{100}$ represents an alkyl group, an alkenyl group, a cycloalkenyl group or an aryl group, $M^1$ represents a silicon atom or a tin atom, L represents a halogen atom or a hydrocarbyloxy group, and a represents an integer of 0 to 2.

Examples of the coupling agent represented by the above formula (10) include silicon tetrachloride, methyltrichlorosilane, dimethyldichlorosilane, tin tetrachloride, methyltrichlorotin, dimethyldichlorotin, tetramethoxysilane, methyltrimethoxysilane, dimethoxydimethylsilane, methyltriethoxysilane, ethyltrimethoxysilane, dimethoxydiethylsilane, diethoxydimethylsilane, tetraethoxysilane, ethyltriethoxysilane, and diethoxydiethylsilane.

In the case of adding a coupling agent to a polymerization solution, the amount of the coupling agent to be added is adjusted, in order to improve the processability of the conjugated diene-based polymer to be formed, preferably to 0.03 mol or more, more preferably 0.05 mol or more per 1 mol of the alkali metal derived from the alkali metal-based polymerization initiator. In order to improve fuel economy, it is preferably 0.4 mol or less, more preferably 0.3 mol or less.

In the method for producing a conjugated diene-based polymer of the present invention and the method for producing a modified conjugated diene-based polymer of the present invention, an unreacted active end of a polymer may be treated with an alcohol such as methanol, isopropyl alcohol, and 1-butanol before recovering the polymer from the solution in which the polymer is dissolved.

The method to be used for recovering the formed conjugated diene-based polymer or the modified conjugated diene-based polymer from the solution in which the polymer is dissolved may be a method known in the art, and examples of such a method include (a) a method of adding a coagulating agent to the solution containing the conjugated diene-based polymer or the modified conjugated diene-based polymer, and (b) a method of adding steam to the solution containing the conjugated diene-based polymer or the modified conjugated diene-based polymer. The conjugated diene-based polymer or the modified conjugated diene-based polymer recovered may be dried with a known drier such as a band drier or an extrusion-type drier.

The Mooney viscosity ($ML_{1+4}$) of the conjugated diene-based polymer or the modified conjugated diene-based polymer in the present invention is preferably 10 or more, more preferably 20 or more in order to enhance the tensile strength at break of a polymer composition. In order to improve the processability of the polymer composition, the Mooney viscosity is preferably 200 or less, and more preferably 150 or less. The Mooney viscosity ($ML_{1+4}$) is measured at 100° C. in accordance with JIS K6300 (1994).

In order to enhance the fuel economy of a tire to be obtained, the amount of vinyl bonds of a conjugated diene-based polymer or a modified conjugated diene-based polymer in the present invention is preferably 80% by mol or less, and more preferably 70% by mol or less where the content of the monomer units derived from the conjugated diene compound is taken as 100% by mol. In order to improve the gripping property of a tire to be obtained, the amount of vinyl bonds is preferably 10% by mol or more, more preferably 15% by mol or more, even more preferably 20% by mol or more, and particularly preferably 40% by mol or more. The amount of vinyl bonds is determined from the absorption intensity at around 910 $cm^{-1}$, which is an absorption peak of a vinyl group, by infrared spectroscopy.

A polymer composition can be prepared by incorporating other polymer components, additives, or the like to the conjugated diene-based polymer or the modified conjugated diene-based polymer of the present invention.

Examples of such other polymer components include a styrene-butadiene copolymer rubber, a polybutadiene rubber, a butadiene-isoprene copolymer rubber, and a butyl rubber. Further examples include a natural rubber, an ethylene-propylene copolymer, and an ethylene-octene copolymer. Such polymer components may be used in a combination of two or more thereof.

In the case of incorporating other polymer components to the conjugated diene-based polymer or the modified conjugated diene-based polymer of the present invention, the content of the conjugated diene-based polymer or the modified conjugated diene-based polymer of the present invention in the resulting polymer composition is preferably 10% by weight or more, and more preferably 20% by weight or more per 100% by weight of the total amount of the polymer components (including the conjugated diene-based polymer) in the polymer composition, in order to improve the fuel consumption performance of a tire to be obtained.

Examples of additives which can be used include additives known in the art, for example, vulcanizing agents such as sulfur; vulcanization accelerators such as thiazole-based vulcanization accelerators, thiuram-based vulcanization accelerators, sulfenamide-based vulcanization accelerators, and guanidine-based vulcanization accelerators; vulcanizing activators such as stearic acid and a zinc oxide; organic peroxides such as dicumyl peroxide and di-tert-butyl peroxide; reinforcing agents such as silica and carbon black; fillers such as calcium carbonate, talc, alumina, clay, aluminum hydroxide, and mica; silane coupling agents; extending oils; processing aids; anti-aging agents; and lubricants.

Examples of the sulfur include powdered sulfur, precipitated sulfur, colloidal sulfur, insoluble sulfur, and highly dispersible sulfur. The loading of the sulfur is preferably 0.1 parts by weight to 15 parts by weight, more preferably 0.3 parts by weight to 10 parts by weight, and even more preferably 0.5 parts by weight to 5 parts by weight per 100 parts by weight of the polymer components.

Examples of the vulcanization accelerator include thiazole-based vulcanization accelerators such as 2-mercaptobenzothiazole, dibenzothiazyl disulfide, and N-cyclohexyl-2-benzothiazylsulfenamide; thiuram-based vulcanization accelerators such as tetramethylthiuram monosulfide and tetramethylthiuram disulfide; sulfenamide-based vulcanization accelerators such as N-cyclohexyl-2-benzothiazolesulfenamide, N-tert-butyl-2-benzothiazolesulfenamide, N-oxyethylene-2-benzothiazolesulfenamide, N-oxyethylene-2-benzothiazolesulfenamide, and N,N'-diisopropyl-2-benzothiazolesulfenamide; and guanidine-based vulcanization accelerators such as diphenylguanidine, diorthotolylguanidine, and orthotolylbiguanidine. The loading of the vulcanization accelerator is preferably 0.1 parts by weight to 5 parts by weight, and more preferably 0.2 parts by weight to 3 parts by weight per 100 parts by weight of the polymer components.

Examples of the reinforcing agent include silica, calcium silicate, aluminum silicate, and carbon black.

Examples of silica include dry silica (anhydrous silicic acid), wet silica (hydrous silicic acid), colloidal silica, and precipitated silica. One or more members thereof may be used. The BET specific surface area of silica is preferably from 50 $m^2/g$ to 250 $m^2/g$. The BET specific surface area is measured in accordance with ASTM D1993-03. Commercially available products such as ULTRASIL VN3-G (trade name) produced by Degussa, VN3, AQ, ER, and RS-150 (trade names) produced by TOSOH SILICA CORPORATION, and Zeosil 1115MP and 1165MP (trade names) produced by Rhodia can be used as silica.

Examples of carbon black include furnace black, acetylene black, thermal black, channel black, and graphite. Examples of such carbon black include channel carbon black such as EPC, MPC, and CC; furnace carbon black such as SAP, ISAF, HAF, MAF, FEF, SRF, GPF, APP, FF, CF, SCF, and ECF; thermal carbon black such as FT and MT; and acetylene carbon black. These may be used in a combination of two or more thereof.

The nitrogen adsorption specific surface area ($N_2SA$) of carbon black is preferably from 5 $m^2/g$ to 200 $m^2/g$, and the dibutyl phthalate (DBP) absorption amount of carbon black is preferably from 5 ml/100 g to 300 ml/100 g. The nitrogen adsorption specific surface area is measured in accordance with ASTM D4820-93 and the DBP absorption amount is measured in accordance with ASTM D2414-93. Commercially available products such as DIABLACK N339 (trade name) produced by Mitsubishi Chemical Corporation, SEAST 6, SEAST 7HM and SEAST KH (trade names) produced by Tokai Carbon Co., Ltd., and CK 3 and Special Black 4A (trade names) produced by Degussa can be used as carbon black.

In order to enhance wear resistance and strength, the content of the reinforcing agent in the polymer composition is preferably 10 parts by weight or more, more preferably 20 parts by weight or more, and even more preferably 30 parts by weight or more per 100 parts by weight of the conjugated diene-based polymer of the present invention. In order to enhance reinforcement, the loading is preferably 150 parts by weight or less, more preferably 120 parts by weight or less, and even more preferably 100 parts by weight or less.

Examples of the silane coupling agent include vinyltrichlorosilane, vinyltriethoxysilane, vinyltris(β-methoxyethoxy)silane, β-(3,4-epoxycyclohexyl)ethyltrimethoxysilane, γ-glycidoxypropyltrimethoxysilane, γ-methacryloxypropyltrimethoxysilane, N-(β-aminoethyl)-γ-aminopropyltrimethoxysilane, N-(β-aminoethyl)-γ-aminopropvlmethyldimethoxysilane, N-phenyl-γ-aminopropyltrimethoxysilane, γ-chloropropyltrimethoxysilane, γ-mercaptopropyltrimethoxysilane, γ-aminopropyltriethoxysilane, bis(3-(triethoxysilyl)propyl)disulfide, bis(3-(triethoxysilyl)propyl)tetrasulfide, γ-trimethoxysilylpropyldimethylthiocarbamyl tetrasulfide, and γ-trimethoxysilylpropylbenzothiazyl tetrasulfide. One or more members of these are used. Commercial products such as Si69 and Si75 (trade names) produced by Degussa can be used as the silane coupling agent.

The loading of the silane coupling agent is preferably 1 part by weight to 20 parts by weight, more preferably 2 parts by weight to 15 parts by weight, and even more preferably 5 parts by weight to 10 parts by weight per 100 parts by weight of the conjugated diene-based polymer of the present invention.

Examples of the extending oil include aromatic mineral oils (viscosity-gravity constant (V. G. C.): from 0.900 to 1.049), naphthene-based mineral oils (V. G. C.: from 0.850 to 0.899), and paraffin-based mineral oils (V. C. C.: from 0.790 to 0.849). The content of a polycyclic aromatic compound in the extending oil is preferably less than 3% by weight, and more preferably less than 1% by weight. The content of the polycyclic aromatic compound is measured in accordance with the IP 346/92 method of The Institute of Petroleum. The content of aromatic compounds (CA) of the extending oil is preferably 20% by weight or more. One or more kinds of extending oils may be used.

Examples of a method that can be used for producing a polymer composition by incorporating other polymer components, additives, or the like to the conjugated diene-based polymer or the modified conjugated diene-based polymer of the present invention include a method of kneading the ingredients with a known mixing apparatus such as a roll and a Banbury mixer.

As to kneading conditions to be used in the case of incorporating an additive other than a vulcanizing agent and a vulcanization accelerator, the kneading temperature is usually 50° C. to 200° C., preferably 80° C. to 190° C., and the kneading time is usually 30 seconds to 30 minutes, preferably 1 minute to 30 minutes. In the case of incorporating a vulcanizing agent and a vulcanization accelerator, the kneading temperature is usually 100° C. or lower, preferably room temperature to 80° C. The composition with a vulcanizing agent and a vulcanization accelerator incorporated therein is usually used after being subjected to vulcanization treatment such as press vulcanization. The vulcanization temperature is usually from 120° C. to 200° C., preferably from 140° C. to 180° C.

The polymer composition in the present invention is used suitably as a material for tires excellent in fuel economy.

EXAMPLES

Evaluation of physical properties was performed by the following methods.
1. Mooney viscosity ($ML_{1+4}$)
In accordance with JIS K6300 (1994), the Mooney viscosity of a polymer was measured at 100° C.

2. The amount of vinyl bonds (unit: % by mol)
The amount of the vinyl bonds of a polymer was determined from the absorption intensity at around 910 $cm^{-1}$, which is an absorption peak of a vinyl group, by infrared spectroscopy.

3. Content of monomer units derived from styrene (unit: % by weight)
The content of the monomer units derived from styrene in a polymer was determined from a refractive index in accordance with JIS K6383 (1995)

4. Fuel Economy
A strip-like specimen of 1 mm or 2 mm in width and 40 mm in length was punched out from a sheet-like vulcanized molding and was subjected to a test. The loss tangent (tan δ (70° C.)) of the specimen at a temperature of 70° C. was measured under the condition represented by a strain of 1% and a frequency of 10 Hz by using a viscoelasticity analyzer (produced by Ueshima Seisakusho Co., Ltd.). The smaller this value is, the better the fuel economy is.

Example 1

A polymerization reactor made of stainless steel equipped with a stirring device of an internal volume of 5 L was washed, dried, and the gas within the polymerization reactor was replaced by dry nitrogen. Subsequently, 2.55 kg of industrial hexane (density 680 kg/$m^3$), 113.4 g of 1,3-butadiene, 66.6 g of styrene, 1.5 ml of tetrahydrofuran, and 1.32 ml of 1,2-dimethoxy-4-methylbenzene were charged into the polymerization reactor. Next, in order to detoxify beforehand impurities that would act to deactivate a polymerization initiator, a small amount of a hexane solution of n-butyllithium was charged as a scavenger into the polymerization reactor.

Subsequently, a n-hexane solution of n-butyllithium (n-butyllithium content 3.10 mmol) was charged into the polymerization reactor, and then a polymerization reaction was initiated.

The polymerization reaction was carried out for 2 hours and 30 minutes. During the polymerization reaction, the temperature within the polymerization reactor was adjusted to 65° C., the solution in the polymerization reactor was stirred at a stirring speed of 130 rpm, and 170.1 g of 1,3-butadiene and 99.9 g of styrene were fed continuously into the polymerization reactor.

After the execution of the above polymerization reaction, 5 ml of a hexane solution including 0.2 ml of methanol was fed into the polymerization reactor, and the resulting polymer solution was stirred for 5 minutes.

After the 5 minute stirring, 1.8 g of 2-tert-butyl-6-(3-tert-butyl-2-hydroxy-5-methylbenzyl)-4-methylphenyl acrylate (produced by Sumitomo Chemical Co. Ltd., trade name: Sumilizer GM) and 0.9 g of pentaerythrityl tetrakis(3-laurylthiopropionate) (produced by Sumitomo Chemical Co., Ltd., trade name: Sumilizer TP-D) were fed into the polymerization reactor, and subsequently the resulting polymer solution was evaporated at room temperature for 24 hours, and further dried under reduced pressure at 55° C. for 12 hours, affording a polymer. The results of evaluation of the polymer are shown in Table 1.

One hundred parts by weight of the resulting polymer, 78.4 parts by weight of silica (produced by Degussa, trade name: ULTRASIL VN3-G), 6.4 parts by weight of a silane coupling agent (produced by Degussa, trade name: Si69), 6.4 parts by weight of carbon black (produced by Mitsubishi Chemical Corporation, trade name: DIABLACK N339), 47.6 parts by weight of an extender oil (produced by Japan Energy Corporation, trade name: JOMO Process NC-140), 1.5 parts by weight of an antiaging agent (produced by Sumitomo Chemical Co., Ltd., trade name: ANTIGENE 3C), 1.5 parts by weight of a wax (produced by Ouchi Shinko Chemical Industrial Co., Ltd., trade name: SUNNOCN), and 2 parts by weight of stearic acid were kneaded with a Labo Plastomill to prepare a polymer composition.

To the resulting polymer composition were added 2 parts by weight of zinc white, 1 part by weight of a vulcanization accelerator (produced by Sumitomo Chemical Co., Ltd., trade name: SOXINOL CZ), 1 part by weight of a vulcanization accelerator (produced by Sumitomo Chemical Co., Ltd., trade name: SOXINOL D), and 1.4 parts by weight of sulfur, followed by shaping into a sheet with a 6-inch roll, and then the sheet was heated at 160° C. for 45 minutes to vulcanize. Thus, a vulcanized sheet was prepared. The results of physical property evaluation of the vulcanized sheet are shown in Table 1.

Comparative Example 1

A polymerization reactor made of stainless steel equipped with a stirring device of an internal volume of 5 L was washed, dried, and the gas within the polymerization reactor was replaced by dry nitrogen. Subsequently, 2.55 kg of industrial hexane (density 680 kg/m$^3$), 113.4 g of 1,3-butadiene, 66.6 g of styrene, 1.5 ml of tetrahydrofuran, and 2.80 ml of 1,2-dimethoxybenzene were charged into the polymerization reactor. Next, in order to detoxify beforehand impurities that would act to deactivate a polymerization initiator, a small amount of a hexane solution of n-butyllithium was charged as a scavenger into the polymerization reactor.

Subsequently, a n-hexane solution of n-butyllithium (n-butyllithium content 3.10 mmol) was charged into the polymerization reactor, and then a polymerization reaction was initiated.

The polymerization reaction was carried out for 2 hours and 30 minutes. During the polymerization reaction, the temperature within the polymerization reactor was adjusted to 65° C., the solution in the polymerization reactor was stirred at a stirring speed of 130 rpm, and 170.1 g of 1,3-butadiene and 99.9 g of styrene were fed continuously into the polymerization reactor.

After the execution of the above polymerization reaction, 5 ml of a hexane solution including 0.2 ml of methanol was fed into the polymerization reactor, and the resulting polymer solution was stirred for 5 minutes.

After the 5 minute stirring, 1.8 g of 2-tert-butyl-6-(3-tert-butyl-2-hydroxy-5-methylbenzyl)-4-methylphenyl acrylate (produced by Sumitomo Chemical Co., Ltd., trade name: Sumilizer GM) and 0.9 g of pentaerythrityl tetrakis(3-laurylthiopropionate) (produced by Sumitomo Chemical Co., Ltd., trade name: Sumilizer TP-D) were fed into the polymerization reactor, and subsequently the resulting polymer solution was evaporated at room temperature for 24 hours, and further dried under reduced pressure at 55° C. for 12 hours, affording a polymer. The results of evaluation of the polymer are shown in Table 0.1.

One hundred parts by weight of the resulting polymer, 78.4 parts by weight of silica (produced by Degussa, trade name: ULTRASIL VIN-G), 6.4 parts by weight of a silane coupling agent (produced by Degussa, trade name: Si69), 6.4 parts by weight of carbon black (produced by Mitsubishi Chemical Corporation, trade name: DIABLACK N339), 47.6 parts by weight of an extender oil (produced by Japan Energy Corporation, trade name: JOMO Process NC-140), 1.5 parts by weight of an anti aging agent (produced by Sumitomo Chemical Co., Ltd., trade name: ANTIGENE 3C), 1.5 parts by weight of a wax (produced by Ouchi Shinko Chemical Industrial Co., Ltd., trade name: SUNNOCN), and 2 parts by weight of stearic acid were kneaded with a Labo Plastomill to prepare a polymer composition.

To the resulting polymer composition were added 2 parts by weight of zinc white, 1 part by weight of a vulcanization accelerator (produced by Sumitomo Chemical Co., Ltd., trade name: SOXINOL CZ), 1 part by weight of a vulcanization accelerator (produced by Sumitomo Chemical Co., Ltd., trade name: SOXINOL D), and 1.4 parts by weight of sulfur, followed by shaping into a sheet with a 6-inch roll, and then the sheet was heated at 160° C. for 45 minutes to vulcanize. Thus, a vulcanized sheet was prepared. The results of physical property evaluation of the vulcanized sheet are shown in Table 1.

Example 2

A polymerization reactor made of stainless steel equipped with a stirring device of an internal volume of 20 L was washed, dried, and the gas within the polymerization reactor was replaced by dry nitrogen. Subsequently, 10.2 kg of industrial hexane (density 680 kg/m$^3$), 536 g of 1,3-butadiene, 264 g of styrene, 6.1 ml of tetrahydrofuran, and 6.37 ml of 1,2-dimethoxy-4-methylbenzene were charged into the polymerization reactor. Next, in order to detoxify beforehand impurities that would act to deactivate a polymerization initiator, a small amount of a hexane solution of n-butyllithium was charged as a scavenger into the polymerization reactor.

Subsequently, a n-hexane solution of n-butyllithium (n-butyllithium content 8.33 mmol) was charged into the polymerization reactor, and then a polymerization reaction was initiated.

The polymerization reaction was carried out for 3 hours. During the polymerization reaction, the temperature within the polymerization reactor was adjusted to 65° C., the solution in the polymerization reactor was stirred at a stirring speed of 130 rpm, and 804 g of 1,3-butadiene and 396 g of styrene were fed continuously into the polymerization reactor.

Subsequently, while the temperature within the polymerization reactor was kept at 65° C., the resulting polymerization solution was stirred at a stirring speed of 130 rpm in the polymerization reactor, and 5.67 mmol of [3-(diethylamino)propyl]trimethoxysilane was added to the polymerization solution, followed by stirring for 15 minutes.

After the 15 minute stirring, 5 ml of a hexane solution including 0.8 ml of methanol was fed into the polymerization reactor, and the resulting polymer solution was stirred for 5 minutes.

After the 5 minute stirring, 8.0 g of 2-tert-butyl-6-(3-tert-butyl-2-hydroxy-5-methylbenzyl)-4-methylphenyl acrylate (produced by Sumitomo Chemical Co., Ltd., trade name: Sumilizer GM) and 4.0 g of pentaerythrityl tetrakis(3-laurylthiopropionate) (produced by Sumitomo Chemical. Co., Ltd., trade name: Sumilizer TP-D) were fed into the polymerization reactor, and subsequently the resulting polymer solution was evaporated at room temperature for 24 hours, and further dried under reduced pressure at 55° C. for 12 hours, affording a polymer. The results of evaluation of the polymer are shown in Table 1.

One hundred parts by weight of the resulting polymer, 78.4 parts by weight of silica (produced by Degussa, trade name: ULTRASIL VN3-G), 6.4 parts by weight of a silane coupling agent (produced by Degussa, trade name: Si69), 6.4 parts by weight of carbon black (produced by Mitsubishi Chemical Corporation, trade name: DIABLACK N339), 47.6 parts by weight of an extender oil (produced by Japan Energy Corporation, trade name: JOMO Process NC-140), 1.5 parts by weight of an antiaging agent (produced by Sumitomo Chemical Co., Ltd., trade name: ANTIGENS 3C), 1.5 parts by weight of a wax (produced by Ouchi Shinko Chemical Industrial Co, Ltd., trade name: SUNNOCN), and 2 parts by weight of stearic acid were kneaded with a Labo Plastomill to prepare a polymer composition.

To the resulting polymer composition were added 2 parts by weight of zinc white, 1 part by weight of a vulcanization accelerator (produced by Sumitomo Chemical Co, Ltd., trade name: SOXINOL CZ), 1 part by weight of a vulcanization accelerator (produced by Sumitomo Chemical Co., Ltd., trade name: SOXINOL D), and 1.4 parts by weight of sulfur, followed by shaping into a sheet with a 6-inch roll, and then the sheet was heated at 160° C. for 45 minutes to vulcanize. Thus, a vulcanized sheet was prepared. The results of physical property evaluation of the vulcanized sheet are shown in Table 1.

Comparative Example 2

A polymerization reactor made of stainless steel equipped with a stirring device of an internal volume of 20 L was washed, dried, and the gas within the polymerization reactor was replaced by dry nitrogen. Subsequently, 10.2 kg of industrial hexane (density 680 kg/m$^3$), 536 g of 1,3-butadiene, 264 g of styrene, 6.1 ml of tetrahydrofuran, and 7.92 ml of 1,2-dimethoxybenzene were charged into the polymerization reactor. Next, in order to detoxify beforehand impurities that would act to deactivate a polymerization initiator, a small amount of a hexane solution of n-butyllithium was charged as a scavenger into the polymerization reactor.

Subsequently, a n-hexane solution of n-butyllithium (n-butyllithium content 8.33 mmol) was charged into the polymerization reactor, and then a polymerization reaction was initiated.

The polymerization reaction was carried out for 3 hours. During the polymerization reaction, the temperature within the polymerization reactor was adjusted to 65° C., the solution in the polymerization reactor was stirred at a stirring speed of 130 rpm, and 804 g of 1,3-butadiene and 396 g of styrene were fed continuously into the polymerization reactor.

Subsequently, while the temperature within the polymerization reactor was kept at 65° C., the resulting polymerization solution was stirred at a stirring speed of 130 rpm in the polymerization reactor, and 5.67 mmol of [3-(diethylamino)propyl]trimethoxysilane was added to the polymerization solution, followed by stirring for 15 minutes.

After the 15 minute stirring, 5 ml of a hexane solution including 0.8 ml of methanol was fed into the polymerization reactor, and the resulting polymer solution was stirred for 5 minutes.

After the 5 minute stirring, 8.0 g of 2-tert-butyl-6-(3-tert-butyl-2-hydroxy-5-methylbenzyl)-4-methylphenyl acrylate (produced by Sumitomo Chemical Co., Ltd., trade name: Sumilizer GM) and 4.0 g of pentaerythrityl tetrakis(3-laurylthiopropionate) (produced by Sumitomo Chemical Co., Ltd., trade name: Sumilizer TP-D) were fed into the polymerization reactor, and subsequently the resulting polymer solution as evaporated at room temperature for 24 hours, and further dried under reduced pressure at 55° C. for 12 hours, affording a polymer. The results of evaluation of the polymer are shown in Table 1.

One hundred parts by weight of the resulting polymer, 78.4 parts by weight of silica (produced by Degussa, trade name: ULTRASIL VN3-G), 6.4 parts by weight of a silane coupling agent (produced by Degussa, trade name: Si69), 6.4 parts by weight of carbon black (produced by Mitsubishi Chemical Corporation, trade name: DIABLACK N339), 47.6 parts by weight of an extender oil (produced by Japan Energy Corporation, trade name: JOMO Process NC-140), 1.5 parts by weight of an antiaging agent (produced by Sumitomo Chemical Co., Ltd., trade name: ANTIGENE 3C), 1.5 parts by weight of a wax (produced by Ouchi Shinko Chemical Industrial Co., Ltd., trade name: SUNNOCN), and 2 parts by weight of stearic acid were kneaded with a Labo Plastomill to prepare a polymer composition.

To the resulting polymer composition were added 2 parts by weight of zinc white, 1 part by weight of a vulcanization accelerator (produced by Sumitomo Chemical Co., Ltd., trade name: SOXINOL CZ), 1 part by weight of a vulcanization accelerator (produced by Sumitomo Chemical Co., Ltd., trade name: SOXINOL D), and 1.4 parts by weight of sulfur, followed by shaping into a sheet with a 6-inch roll, and then the sheet was heated at 160° C. for 45 minutes to vulcanize. Thus, a vulcanized sheet was prepared. The results of physical property evaluation of the vulcanized sheet are shown in Table 1.

TABLE 1

| Randomizer | | Example 1 1,2-Dimethoxy-4-methylbenzene | Comparative Example 1 1,2-Dimethoxy-benzene | Example 2 1,2-Dimethoxy-4-methylbenzene | Comparative Example 2 1,2-Dimethoxy-benzene |
|---|---|---|---|---|---|
| Mooney viscosity | — | 48 | 47 | 60 | 54 |
| Amount of vinyl bonds | % by mol | 41 | 39 | 41 | 41 |
| Content of styrene units | % by weight | 37 | 37 | 33 | 33 |
| Fuel economy tanδ (70° C.) | — | 0.160 | 0.173 | 0.119 | 0.127 |

What is claimed is:

1. A method for producing a modified conjugated diene-based polymer, the method comprising polymerizing monomer components comprising a conjugated diene compound and an aromatic vinyl compound using an alkali metal-based polymerization initiator in the presence of a hydrocarbon solvent and an ether compound selected from 1,2-dimethoxy-4-methylbenzene and 1,2-dimethoxy-4-ethylbenzene to obtain a conjugated diene-based polymer, and then causing a compound containing a nitrogen atom and/or a silicon atom to react with an active end of the conjugated diene-based polymer.

2. The method according to claim 1, wherein the monomer components further comprise a compound containing a nitrogen atom and/or a silicon atom and a hydrocarbyl group having a polymerizable carbon-carbon double bond.

* * * * *